United States Patent [19]
Takahashi et al.

[11] Patent Number: 5,229,862
[45] Date of Patent: Jul. 20, 1993

[54] APPARATUS AND METHOD FOR RECORDING IMAGE SIGNALS TO ALLOW REPRODUCTION AT MORE THAN ONE DATA RATE

[75] Inventors: Takao Takahashi, Tokyo; Hiroshi Kobayashi, Chiba, both of Japan

[73] Assignee: Sony Corporation, Tokyo, Japan

[21] Appl. No.: 783,993

[22] Filed: Oct. 29, 1991

[30] Foreign Application Priority Data

Nov. 16, 1990 [JP] Japan .................. 2-308515

[51] Int. Cl.$^5$ .................. H04N 5/76; H04N 5/783
[52] U.S. Cl. .................. 358/335; 360/33.1
[58] Field of Search ............ 358/335, 906, 310, 330, 358/133, 134; 360/32, 33.1, 35.1

[56] References Cited

U.S. PATENT DOCUMENTS

| 4,633,330 | 12/1986 | Yamamitsu et al. | 358/310 |
| 4,682,250 | 7/1987 | Hirota | 358/310 |
| 4,730,222 | 3/1988 | Schauffele | 358/335 |
| 4,819,059 | 4/1989 | Pape | 358/310 |
| 4,858,026 | 8/1989 | Richards | 358/310 |
| 4,858,032 | 8/1989 | Okada et al. | 358/335 |
| 4,862,292 | 8/1989 | Enari et al. | 358/335 |
| 4,977,454 | 12/1990 | Tsinberg | 358/141 |
| 4,984,094 | 1/1991 | Emori | 358/335 |
| 5,068,744 | 11/1991 | Ito | 358/335 |
| 5,119,208 | 6/1992 | Fujimoto | 358/310 |

FOREIGN PATENT DOCUMENTS 0346973 12/1989 European Pat. Off. .
0361565 4/1990 European Pat. Off. .
0367264 5/1990 European Pat. Off. .
2199982 7/1988 United Kingdom .

Primary Examiner—Tommy Chin
Assistant Examiner—Huy Nguyen
Attorney, Agent, or Firm—William S. Frommer; Alvin Sinderbrand

[57] ABSTRACT

Image signal recording apparatus and methods are provided for recording first and second image data on a record medium wherein the first image data are obtained through sampling of image signals at a first data rate and the second image data have a second data rate lower than the first data rate such that the second image data may be reproduced by apparatus operating at the second data rate. The second image data are formed from the first image data and recorded together with at least a portion of the first image data in predetermined areas of the recording medium. The portion of the first image data recorded on the recording medium is selected such that the first image data may be derived by reproducing apparatus operating at the first data rate from the second image data and the portion of the first image data. Area discriminating codes are recorded on the recording medium for identifying the predetermined areas in which the second image data and the portion of the first image data are recorded.

24 Claims, 16 Drawing Sheets

FIG. 2 *(PRIOR ART)*

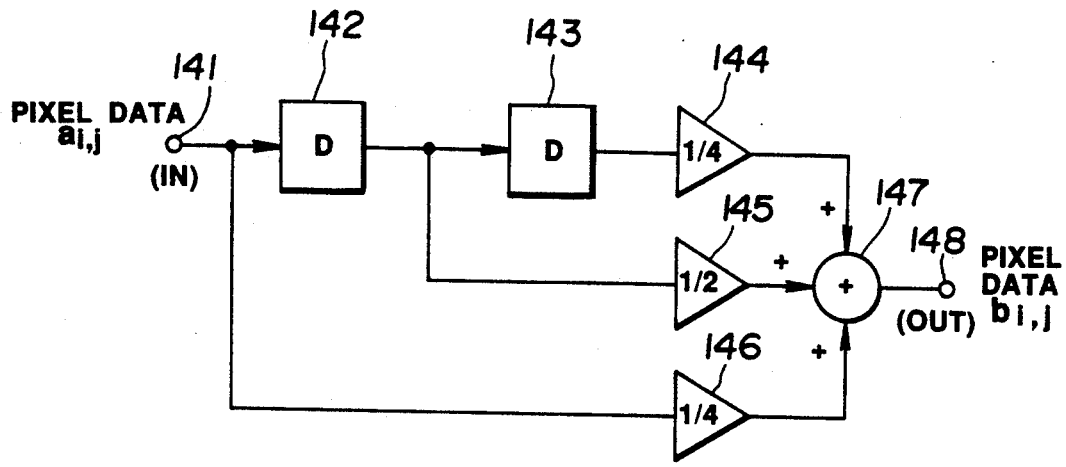
FIG. 11
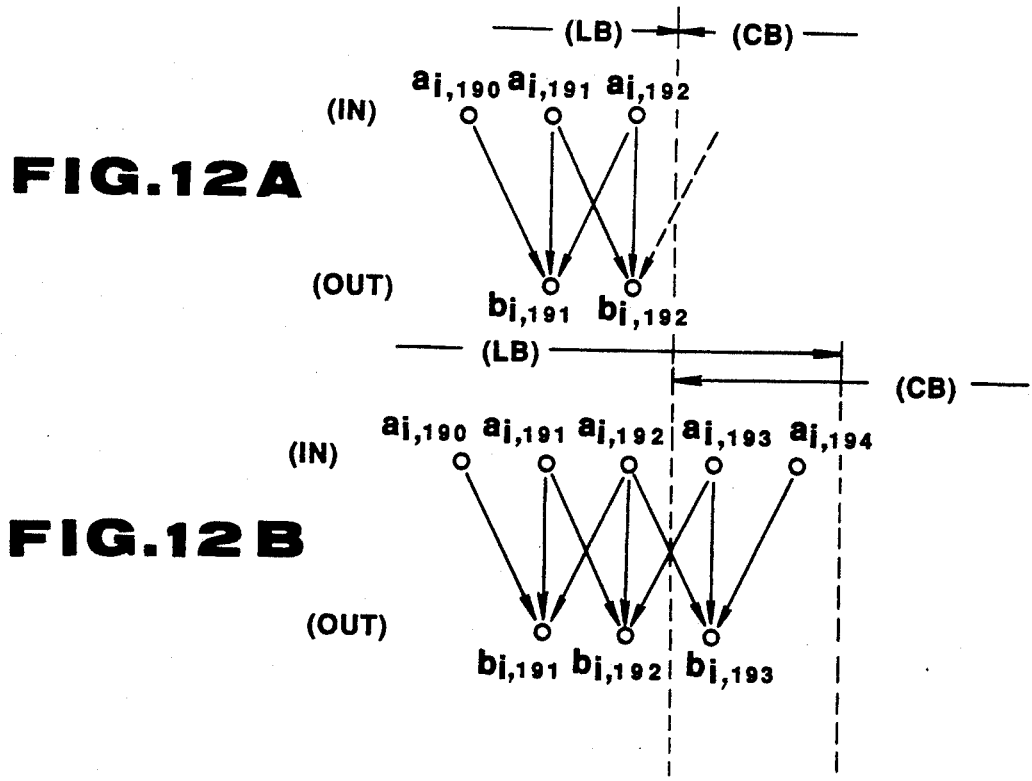
FIG. 12A
FIG. 12B

APPARATUS AND METHOD FOR RECORDING IMAGE SIGNALS TO ALLOW REPRODUCTION AT MORE THAN ONE DATA RATE

BACKGROUND OF THE INVENTION

The present invention relates to image signal recording apparatus and methods, for example, in which a still image is recorded digitally in a PCM audio recording area of a magnetic tape by an 8 mm video tape recorder.

Several known apparatus are available for recording still video pictures on recording media, such as magnetic media. For example, an electronic still camera records video images on a still video floppy disk. Another such device is the 8 mm video tape recorder (VTR) which is provided with a built-in camera.

FIG. 1 illustrates a standard format employed by an 8 mm VTR for recording signals on a magnetic tape 170. The tape 170 is wound circumferentially about a rotary head drum of the 8 mm VTR to an angular extent of 211 degrees. The head drum includes a pair of diametrically opposed rotary heads which scan the tape 170 along helically extending paths in order to form obliquely extending recording tracks 171 on the tape 170. Each of the tracks 171 includes a video area 172 extending for 180 degrees of the 211 degree extent of each track 171. The VTR records frequency multiplexed signals in the video area 172 including frequency modulated luminance signals, subcarrier chrominance signals which have been shifted to a lower frequency band, frequency modulated audio signals and a plurality of pilot signals provided for tracking control. The remaining portion of each track 171 extending for approximately 30 degrees is set aside for recording pulse code modulated (PCM) audio signals digitized at 8 bits per sample and processed by non-linear quantization. The pulse code modulated audio signals are cross-interleaved for error correction and synchronizing signals, parities and identification signals are added thereto prior to recording. A cue track 174 is recorded longitudinally on a first lateral edge of the tape 170 by a fixed head, and an audio track 175 is recorded longitudinally by another fixed head along the opposite lateral edge of the tape 170. The cue track 174 as well as the audio track 175 may be used to record cue or editing signals for locating previously recorded information.

Japanese Patent Publication No. 58-164383 (1983) describes a technique for recording still pictures such as letter or character information by after-recording in the PCM audio area 173 to superimpose titles, casts or explanatory text on moving pictures recorded in the video area 172.

If it is desired to record a high resolution still picture with the use of the 8 mm VTR by recording digitally in the PCM audio area of the tape, it is necessary to employ a relatively high sampling frequency and a suitable imaging device such as a CCD image sensor having a relatively large number of photoelectric converting elements. Such apparatus, referred to hereinafter as an "upper level system", is relatively complex and costly. Less expensive 8 mm VTR's, referred to hereinafter as "lower level systems", employ CCD image sensors having a relatively smaller number of photoelectric converting elements so that a lower sampling frequency is used thereby.

Due to the disparity in data rates between the upper and lower level systems, it is difficult to realize interchangeability of recordings so that a tape recorded with the use of an upper level system may not be reproduced by a lower level system without processing the recorded signals, for example, by interpolation in order to derive picture data having the necessary low data rate. An example of such an interpolation process is illustrated in FIG. 2 wherein the picture data $a_1, a_2, \ldots a_{1152}$ of each line of a first video signal are recorded by an upper level system and are to be combined by interpolation to form picture data $b_1, b_2, \ldots b_{768}$ in each line of a converted video signal having a data rate which is compatible with that of a lower level system. In the example of FIG. 2, therefore, the ratio of the data rate of the upper level system to that of the lower level system is 6:4. The interpolation process is carried out by combining selected pairs of the data $a_1, a_2, \ldots a_{1152}$ to form corresponding ones of the data $b_1, b_2, \ldots b_{768}$. For example, pixel $b_2$ is obtained by calculating an average of the pixels $a_2$ and $a_3$. Other interpolation formulae may instead be employed; for example, pixel $b_2$ may be derived instead as follows:

$$b_2 = (a_1 + 3a_2 + 3a_3 + a_4)/8$$

It will be appreciated that in order to carry out the necessary conversion of the video signals generated by the upper level system for reproduction by the lower level system as described above, a signal processing system must be provided having a memory capability in order to carry out the interpolation process. This results in increased complexity and cost of the lower level system.

OBJECTS AND SUMMARY OF THE INVENTION

Accordingly, it is an object of this invention to provide improved image signal recording apparatus and methods which avoid the above described disadvantages and shortcomings associated with the prior art.

Another object of the invention is to provide improved image signal recording apparatus and methods which enable relatively simple and low cost reproducing systems utilizing relatively low data rates to reproduce images recorded at relatively higher data rates.

It is a further object of the invention to provide a still image recording apparatus and method capable of recording high resolution still image data having a relatively high data rate in a form which is reproducible by still image reproducing apparatus operating at relatively lower sampling frequencies.

In accordance with an aspect of the present invention, an image signal recording apparatus is provided for recording first and second image data on a recording medium, the first image data being obtained through sampling of image signals at a first data rate and the second image data having a second data rate lower than the first data rate such that the second image data may be reproduced by apparatus operating at the second data rate. The apparatus comprises data forming means for forming the second image data from the first image data; data recording means for recording the second image data and at least a portion of the first image data in predetermined areas of the recording medium, the portion of the first image data recorded on the recording medium being selected such that the first image data may be derived by reproducing means operating at the first data rate from the second image data and said portion of the first image data; and area discriminating code recording means for recording area discriminating code data on the recording medium for identifying the predetermined areas in which the second image data and the portion of the first data are recorded.

In accordance with another aspect of the present invention, a method is provided for recording first and second image data on a recording medium, the first image data being obtained through sampling image signals at a first data rate and the second image data having a second data rate lower than the first data rate such that the second image data may be reproduced by apparatus operating at the second data rate. The method comprises the steps of forming the second image data from the first image data; recording the second image data and at least a portion of the first image data in predetermined areas of the recording medium, the portion of the first image data recorded on the recording medium being selected such that the first image data may be derived by reproducing means operating at the first data rate from the second image data and the portion of the first image data; and recording area discriminating code data on the recording medium for identifying the predetermined areas in which the second image data and the portion of the first image data are recorded.

The above, and other objects, features and advantages of the invention, will be apparent in the following detailed description of certain illustrative embodiments thereof which is to be read in connection with the accompanying drawings forming a part hereof, and wherein corresponding parts and components are identified by the same reference numerals in the several views of the drawings.

BRIEF DESCRIPTION OF THE DRAWINGS

FIG. 11 is a circuit block diagram of a filter circuit employed in an upper level system;

FIGS. 12A and 12B are diagrammatic views of spacial arrays of pixel data divided into overlapping areas for illustrating the operation of the filter of FIG. 11;

DETAILED DESCRIPTION OF CERTAIN PREFERRED EMBODIMENTS

Figure 3:
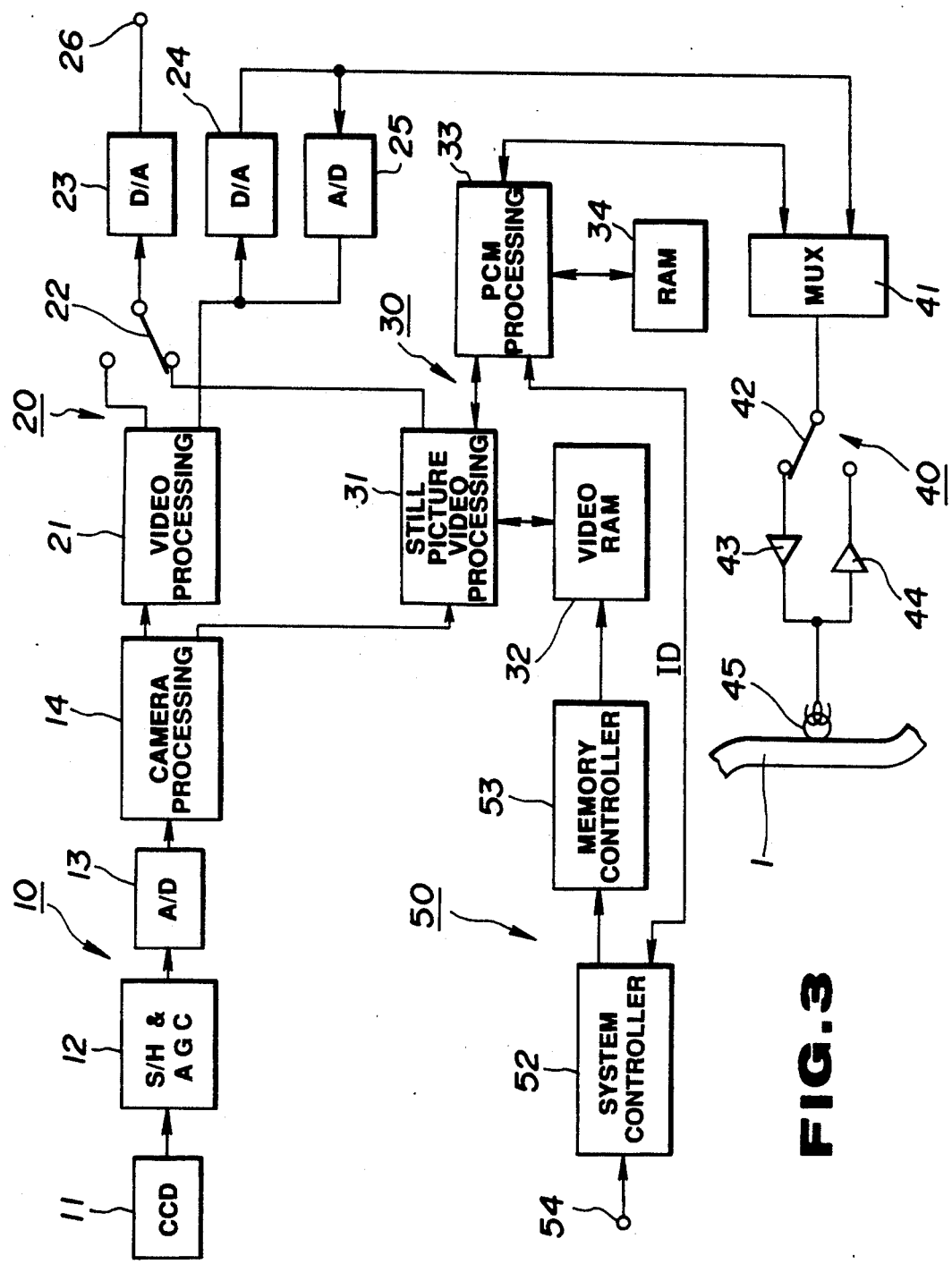
FIG. 3 is a circuit block diagram of an 8 mm VTR having a built in camera and functioning as an upper level system, according to one embodiment of the present invention.

Referring to the drawings in detail, and presently to FIG. 3 thereof, the 8 mm VTR illustrated therein is an upper level system capable of recording still picture data on a magnetic tape 1 so that the same may be reproduced either as a first data signal having a data rate $SCK_1$ of a relatively high frequency $f_1$ or as a second data signal having a relatively lower data rate $SCK_2$ having a frequency $f_2$. More specifically, in the embodiment of FIG. 3, the frequency $f_1$ of the first data rate $SCK_1$ is selected as 6fsc, whereas the frequency $f_2$ of the sampling clock $SCK_2$ is selected as 4fsc.

Figure 1:
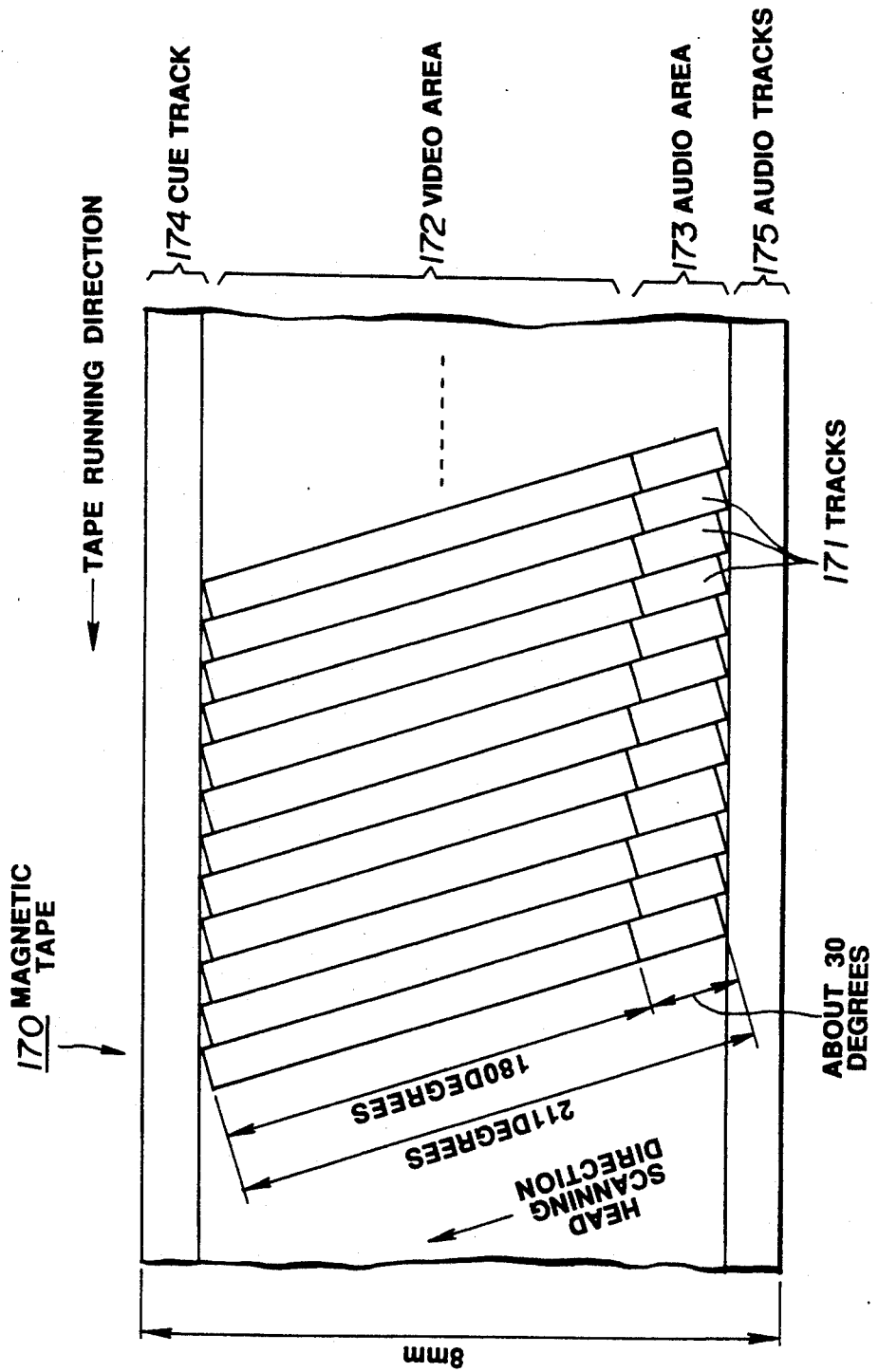
FIG. 1 illustrates a tape recording format employed by a known 8 mm VTR.
Figure 2:
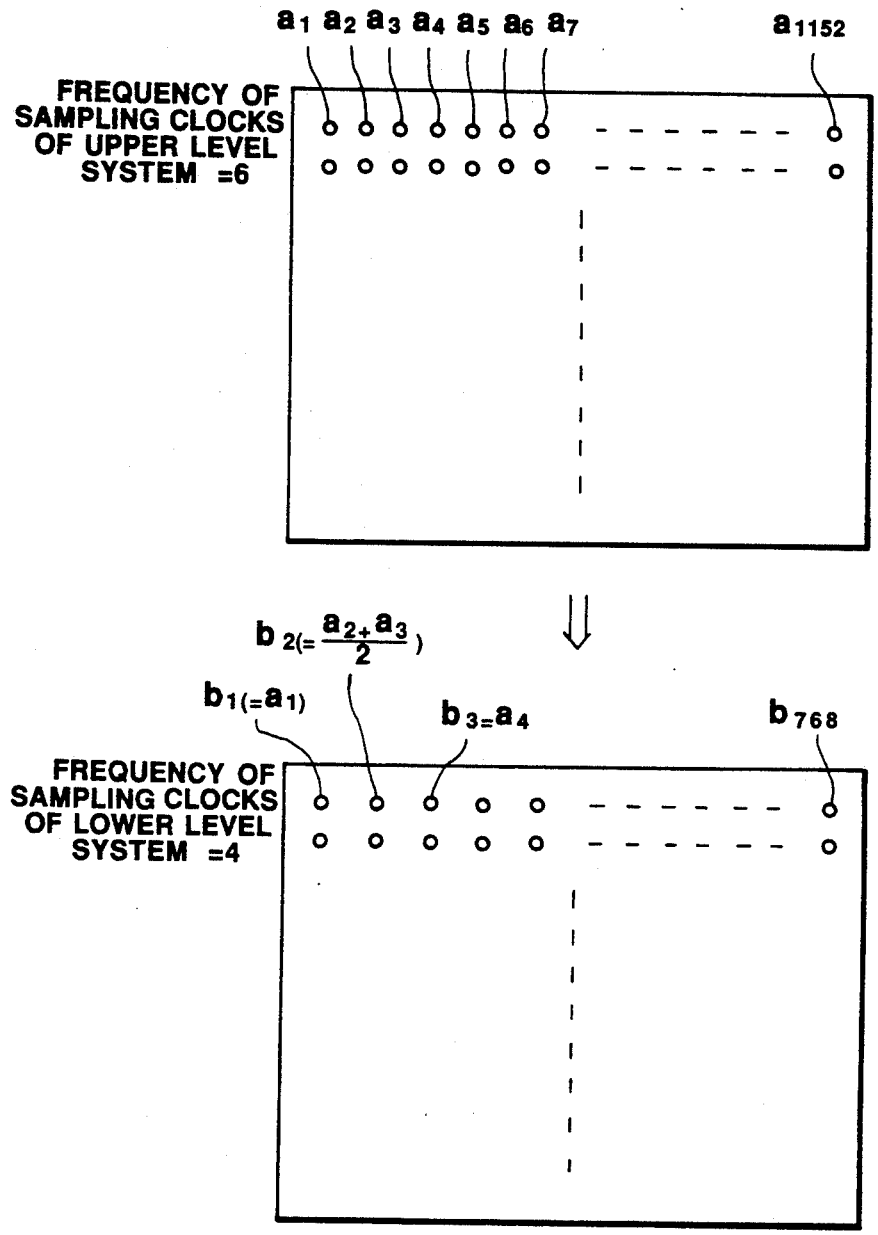
FIG. 2 is a diagrammatic view of a spacial array of pixel data for illustrating a method of forming pixel data having a relatively low data rate by interpolating other pixel data having a relatively higher data rate.

The VTR of FIG. 3 includes a camera and signal preprocessing subsystem 10 for converting images into digital video signals having a data rate which is selectively either $SCK_1$ or $SCK_2$ and for carrying out video signal preprocessing, and a moving picture video signal processing subsystem 20 for converting the digital video signals from the subsystem 10 into analog video signals for recording on the magnetic tape 1, and for converting playback RF signals from the magnetic tape 1 into NTSC-type analog video signals. The VTR of FIG. 3 also includes a still picture video signal processing subsystem 30 for forming digital video image signals having the data rate $SCK_2$ from digital video image signals supplied by the subsystem 10 and having a data rate $SCK_1$ for recording on the tape 1 and for reproducing digital video image signals from reproduced RF signals from the tape 1. The VTR further includes a recording and reproducing subsystem 40 which is operative in a recording mode for time division multiplexing analog video signals from the moving picture video signal processing subsystem 20 and the digital video image signals from the still picture video signal processing subsystem 30 for recording separately in the video area (area 172 in FIG. 1) and the PCM audio area (area 173 in FIG. 1) of the magnetic tape 1 and in a reproducing mode for reproducing playback RF signals from the magnetic tape 1. The VTR finally includes a control subsystem 50 for exercising control of the signal processing operations of the still picture video signal processing subsystem 30.

The subsystem 10 includes a CCD image sensor 11 which provides a video image signal at an output thereof coupled with an input of a sample-and-hold and automatic gain control circuit 12 which samples the image signals at a rate determined by a selected one of the sampling rates $SCK_1$ and $SCK_2$ The sampled signals are provided at an output of the circuit 12 coupled with an input of an analog-to-digital converter 13 which converts the sampled signals to digital form and provides the digitized video image signals to a camera processing circuit 14 which carries out knee and gamma processing of the digitized video image signals.

The moving picture video signal processing subsystem 20 includes a video processing circuit 20 having an input coupled with the camera processing circuit 14 to receive the digitized video image signals for producing NTSC video signals therefrom which it provides to a first fixed terminal of a changeover switch 22. A moveable terminal of the switch 22 is coupled with the input of a digital-to-analog converter 23 which, when coupled by the switch 22 to its first fixed input terminal, is operative to convert the NTSC signals from the video processing circuit 21 to analog form for provision to an output terminal 26 of the VTR.

The video processing circuit 21 is further operative to convert NTSC video signals to a format referred to hereinafter as "moving picture data" in a form suitable for recording in the video areas of the slant recording tracks of the magnetic tape 1. That is, the video processing circuit 21 serves to frequency modulate luminance signals included in the digitized video image signals provided from the camer processing circuit 14 and to shift subcarrier chrominance signals included therein to a lower frequency band in order to produce the moving picture data in the form of frequency multiplexed signals. The curcuit 21 provides the moving picture data to the input of a digital-to-analog converter 24 for conversion to analog form for recording on the tape 1. The video processing circuit 21 is also coupled with the output of an analog-to-digital converter 25 from which it receives digitized moving picture data played back from the tape 1 and converts the received signals into the same format as the digitized video image signals received from the camera processing circuit 14.

The still picture signal processing subsystem 30 includes a video RAM 32 having an 1152 sample by 484 line by 8 bit storage capacity which is adapted to store the digitized video image signals received from the camera processing circuit 14 provided either in the form of a single field or a single frame thereof as video image data. The video RAM 32 is coupled with a still picture video processing circuit 31 which serves to read the stored video image data from the video RAM 32. If the stored image data were provided at a data rate of $SCK_1$, the still picture video processing circuit 31 serves to form video image data having a data rate $SCK_2$ from the signals read from the video RAM 32. In a first embodiment of the still picture video processing circuit 31, this process is carried out by selecting predetermined pixels of the data stored in the video RAM 32 on a line by line basis totaling two thirds of the stored data, thereby permitting the data rate of the newly formed video image data to be selected as 4fsc instead of 6fsc. In accordance with a second embodiment of the still picture video processing circuit 31, the formation of the image data having the sampling rate $SCK_2$ is carried out by interpolating at least selected ones of the image data stored in the video RAM 32.

The still picture video processing circuit 31 is further operative to compress the newly formed video image data by dividing the data into blocks representing spacially adjacent pixels and carrying out adaptive dynamic range coding of the data in each block in accordance with a number of bits per pixel allocated in accordance with the dynamic range of each block. Significant data compression is achieved in this manner due to the strong correlation of the video signals in time and space.

The compressed data produced by the still picture video processing circuit 31 is supplied thereby to a PCM processing circuit 33 which stores the compressed data temporally in a RAM 34. The PCM processing circuit 33 is operative to append synchronization signals, error correction code data and identification data (ID) supplied by the control subsystem 50 to the compressed data in order to produce still picture data for recording on the magnetic tape 1. In a reproduction mode, the PCM processing circuit 33 serves to separate and detect the ID from the reproduced still picture data to determine whether the signals received upon playback represent data having a data rate of $SCK_2$ or only data having a data rate of $SCK_1$. The playback signals which were recorded in compressed form are supplied by the PCM processing circuit 33 to the still picture video processing circuit 31 which expands the received compressed signals to reproduce the video image data therefrom.

The recording and reproducing subsystem 40 includes a time division multiplexer (MUX) 41 which serves to time divisionally multiplex the analog video signals provided by the moving picture video signal processing subsystem 20 for recording in the video areas of the magnetic tape 1 and the compressed still picture data provided by the still picture video signal processing subsystem 30 for recording in the PCM audio areas of the magnetic tape 1. The subsystem 40 also includes a recording amplifier 43 coupled with a first fixed terminal of a changeover switch 42 to receive the time divisionally multiplexed analog and digital signals from the multiplexer 41 to supply the time multiplexed signals in amplified form to a rotary recording head 45 for recording on the tape 1. The subsystem 40 further includes a playback amplifier 44 having an input coupled with the head 45 for amplifying playback signals received therefrom and supplying the amplified signals to a second fixed terminal of the switch 42 to be provided in a reproduction mode through the multiplexer 41 to the appropriate ones of the subsystems 20 and 30 for processing as reproduced signals.

The control subsystem 50 includes a system controller 52 for controlling recording and reproducing modes and generating the ID's for recording with the still picture data. The subsystem 50 also includes a memory controller 53 which is operative to generate write and read addresses for the video RAM 32 under the control of the system controller 52.

In operation during a still picture photographing mode, the user actuates a shutter control (not shown for purposes of simplicity and clarity) in order to select an image to be recorded by the VTR as a still picture. Actuation of the shutter control is detected by the system controller 52 upon receipt thereof of a corresponding signal at an input terminal 54. The system controller 52 is also provided with a further control signal produced by the actuation of a further control (not shown for purposes of simplicity and clarity) which determines whether the still picture is to be generated at a data rate of $SCK_1$ or $SCK_2$. When the controller 52 senses that the shutter control has been actuated, the controller 52 causes a frame or a field of the digital video signals supplied by the camera processing circuit 14 to be processed by the still picture video signal processing subsystem 30 for recording as digital image signals in the PCM audio area of the magnetic tape 1 by means of the recording and reproducing subsystem 40.

In greater detail, the digital video signals supplied by the camera processing circuit 14 are supplied to the video RAM 32 via the still picture video processing circuit 31. The video RAM 32 stores the received signals sequentially in memory locations determined by write addresses produced by the memory controller 53 in synchronism with the line-sequential scanning of the CCD image sensor 11. Subsequently, the video RAM 32 reads the stored image data signals sequentially to the still picture video processing circuit 31 utilizing readout address data produced by the memory controller 53 synchronized with the data compression operations of the circuit 31. If the stored image data were produced at a date rate $SCK_1$, circuit 31 then proceeds to generate video image data having the data rate $SCK_2$ from the image data read sequentially from the video RAM 32 either by selecting predetermined pixel data therefrom, by interpolation or both and compresses the thus produced video image data together with the remaining portions of the data stored in the video RAM 32 or such portions thereof as may be necessary to reconstruct the data having the data rate $SCK_1$ upon reproduction by an upper level system. The compressed data thus produced by the circuit 31 is provided thereby to the PCM processing circuit 33 which temporarily stores the compressed data in the RAM 34. The PCM processing circuit 3 subsequently reads the data stored in the RAM 34 sequentially and appends synchronizing signals, error correction code data and ID's indicating a recording configuration of the still picture data supplied from the system controller 52 (as described below) to generate the still picture data to be supplied to the multiplexer 41.

At the same time, the video processing circuit 21 processes the digitized video signals supplied by the camera processing circuit 14 for conversion into NTSC-type signals which it supplies, in turn, to the digital-to-analog converter 23 by means of the changeover switch 22. The NTSC-type video signals are converted by the converter 23 into analog signals which are provided to a video monitor by means of the terminal 26, thus enabling the user to monitor the image recorded as a still picture by the VTR. If a moving picture is being recorded simultaneously with a recording of the still picture, the video processing circuit 21 simultaneously produces the frequency-multiplexed moving picture data which it supplies to the digital-to-analog converter 24 for conversion into analog video signals supplied thereby to the multiplexer 41.

The multiplexer 41 multiplexes the received signals as described above to supply the same to the rotary head 45 via the changeover switch 42 and the amplifier 43 for recording in the respective areas of the magnetic tape 1. As a result, the still picture data is recorded in a number of from ten to several hundreds of tracks of the PCM audio area of the tape 1 in digital form simultaneously with the ID's indicated the recording configuration of the still picture data. It is noted that the number of tracks employed to record the still picture data depends on the data compression ratio. The analog video signals produced from the moving picture data are selectively recorded in the corresponding tracks of the video area. However, if the user chooses to record still picture data in the PCM audio area without recording the analog video signals in the video area of the tape 1, the moving picture video signal processing subsystem 20 is then disabled.

Figure 4:
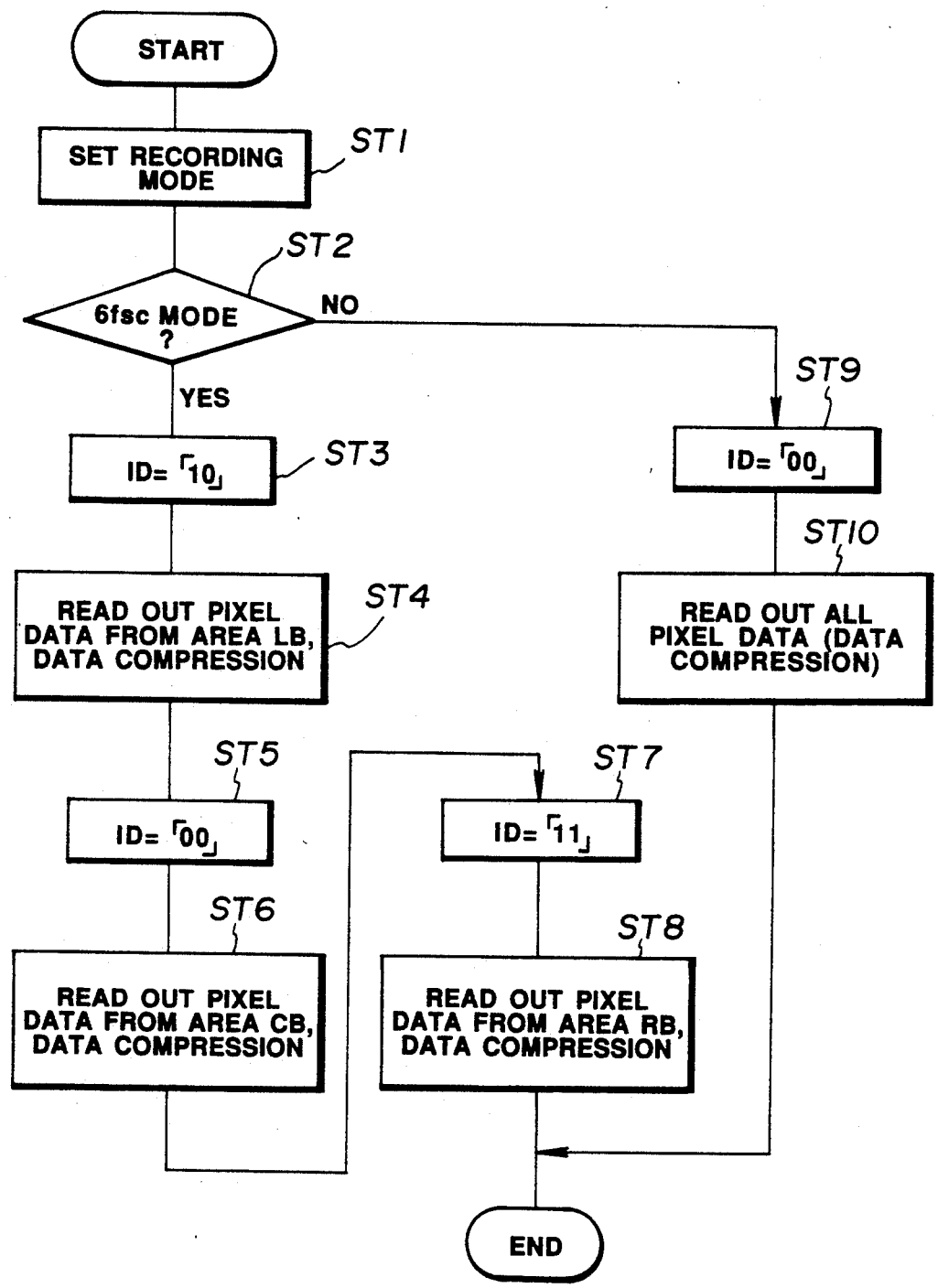
FIG. 4 is a flow chart for illustrating a process carried out in the course of recording still image data with the use of the upper level system of FIG. 1.
Figure 5:
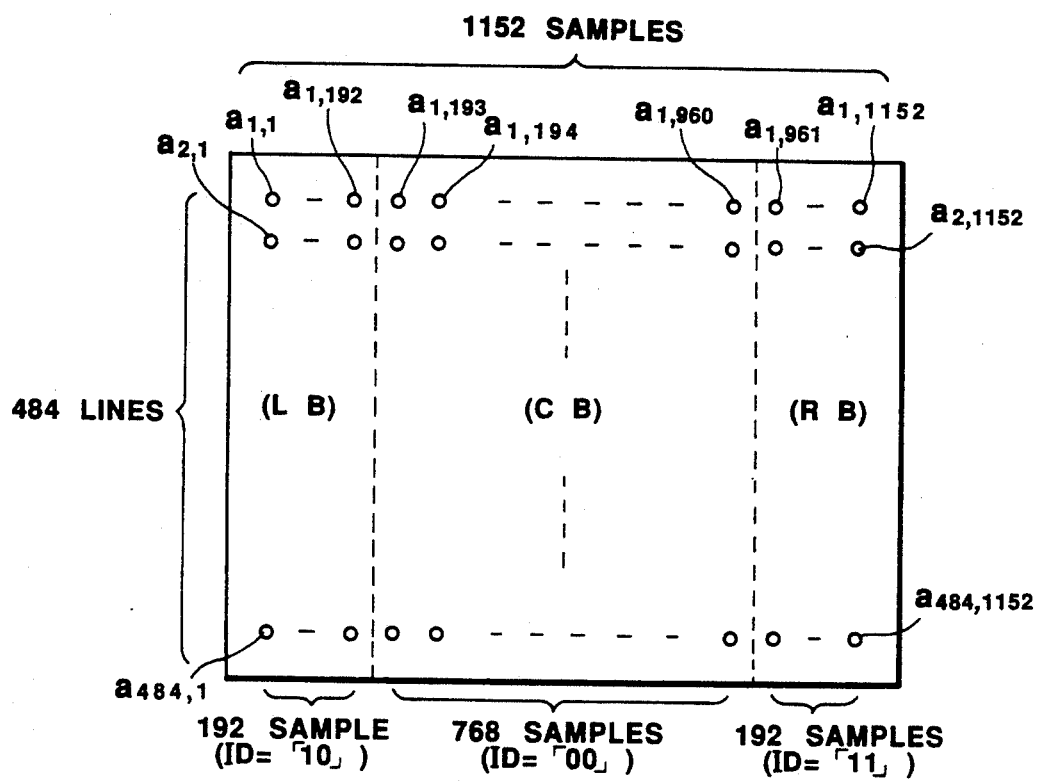
FIG. 5 is a diagrammatic view of a spacial array of pixel data stored in a video memory of the upper level system of FIG. 3 and divided into respective data areas in accordance with a first exemplary manner.

With reference now to the flow chart of FIG. 4, a process for forming video image data having a data rate $SCK_2$ from stored image data having the date rate $SCK_1$ is illustrated therein. With reference also to FIG. 5, a spacial array of respective pixel data of the video image data having a data rate of $SCK_1$ and produced in a 6fsc mode of the VTR of FIG. 3 is illustrated therein. The pixel data as illustrated in the array of FIG. 5 are designated $a_{i,j}$ where i represents a line number of the array from 1 to 484 and j represents a number of from 1 to 1152 representing the position of each of the pixel data in its respective line in ascending order from left to right, as supplied by the subsystem 10 in the 6fsc mode. It will be appreciated that, if the VTR were operating in a 4fsc mode such that the data rate were equal to $SCK_2$, the spacial array of pixel data supplied by the subsystem 10 would instead include 768 samples in each of the 484 lines or two thirds the amount of data contained in the array in FIG. 5.

With reference again to FIG. 4, in a step ST1 thereof, a user selects the mode in which the subsystem 10 either produces high resolution image data having a data rate of 6fsc (the 6fsc mode) or relatively lower resolution image data having a data rate 4fsc (the 4fsc mode). In a step ST2, the system controller 52 detects the mode thus selected by the user in step ST1 for determining a sequence in which the image data shall be read from the video RAM 32 and the identification data (ID) to be appended thereto in order to enable subsequent reproduction of the image data produced either with a data rate of 6fsc or 4fsc by a lower level system operating at a data of only 4fsc. If the image data was produced in the 6fsc mode, the video RAM 32 stores image data having 1152 samples per line, as illustrated in FIG. 5. In order to permit reproduction of an image by a lower level system from the image data thus stored in the video RAM 33, the system controller 52 generates identification data (ID) to be appended to each of samples $a_{1,193}$ through $a_{1,960}$ of the image data as illustrated in FIG. 5 which Will be detected by the lower level system upon playback thus enabling it to reproduce a central portion indicated as area CB in FIG. 5 of the corresponding image.

Accordingly, in the 6fsc mode, in a step ST3 the system controller 52 generates an ID of "10" to be appended to the data $a_{1,1}$, through $a_{1,192}$ of each line of the stored image data indicating that such data falls within an area LB of the image, as depicted in FIG. 5, and that the same are required only by an upper level system upon reproduction. The ID is provided by the system controller 52 to the PCM processing circuit 33, whereupon the step ST4 is carried out. In step ST4, the image data corresponding with the area LB of FIG. 5 are read from the video RAM 32 with the use of readout addresses produced by the memory controller 53 in response to control signals from the system controller 52. The still picture video processing circuit 31 thereupon compresses the pixel data $a_{i,1}$ through $a_{i,192}$ and supplies the compressed data to the PCM processing circuit 33 which proceeds to append the ID "10" to the compressed data for recording by means of the subsystem 40 in the PCM audio areas of the magnetic tape 1.

Subsequently, the system controller 52 generates an ID of "00" in a step ST5 for identifying the 768 samples of each line of the data array illustrated in FIG. 5 corresponding with the area CB for indicating that such data is to be reproduced both by upper and lower level systems operating with respective data rates of 6fsc and 4fsc when reproducing such data. The system controller provides the ID "00" to the PCM processing circuit 33 in step ST5 and then proceeds to step ST6. In step ST6, the pixel data $a_{i,193}$ through $a_{i,960}$ of the FIG. 5 array are read from the Video RAM 32 to the still picture video processing circuit 31 under the control of readout addresses produced by the memory controller 53 in response to corresponding control signals from the system controller 52. Once again, the circuit 31 compresses the received data and supplies the same to the PCM processing circuit 33, which then appends the ID "00" to the compressed data for recording in respective predetermined areas of the magnetic tape 1.

Subsequently in a step ST7, the system controller 52 generates an ID of "11" indicating that the corresponding pixel data includes data $a_{i,961}$ through $a_{i,1152}$ corresponding to image area RB of FIG. 5. The ID "11" indicates that the data $a_{i,961}$ through $a_{i,1152}$ are not to be reproduced by a lower level system, but instead are intended for use only by an upper level system capable of reproducing image data with a data rate of 6fsc. Thereafter, in a step ST8 the video RAM 32 reads out the data $a_{i,961}$ through $a_{i,1152}$ to the circuit 31 in response to readout addresses produced by the memory controller 53 under the control of the system controller 52. As before, the circuit 31 compresses the received pixel data and supplies the compressed data to the PCM processing circuit 33. The compressed data corresponding with pixels $a_{i,961}$ through $a_{i,1152}$ received by the circuit 33 are then supplied with an appended ID of "11" and subsequently recorded in predetermined areas of the magnetic tape 1 by the subsystem 40.

If, however, in the step ST2 the system controller determines that the image data was produced in the 4fsc mode, the process branches to a step ST9 in which the system controller 52 produces an ID of "00" and supplies the same to the PCM processing circuit 33 before proceeding to a step ST10. At the step ST10, the system controller 52 provides control signals to the memory controller 53 causing the same to produce appropriate readout addresses which it supplies to the video RAM 32 so that the same will then read out all of the pixel data stored therein. It will be appreciated that since the image data was produced in the 4fsc mode, an array of 768 samples by 484 lines was thereupon stored in the video RAM 32, so that the entire image thus produced may be recorded for reproduction by either an upper or lower level system operating in the 4fsc mode. Accordingly, after compression of the data read from the video RAM 32 by means of the circuit 31, the PCM processing circuit 33 appends the ID "00" to the compressed data which is recorded on the magnetic tape 1 by the subsystem 40.

It will be appreciated, therefore, that image data having a data rate $SCK_2$ (that is 4fsc) are formed by the RAM 32 and still picture video processing circuit 31 in cooperation with the system controller 52 and memory controller 53. It will be appreciated further that the PCM processing circuit 33 and the subsystem 40 together serve as a means for recording image data having a data rate $SCK_2$ to permit reproduction thereof by a lower level system, as well as for recording high resolution image data having a data rate $SCK_1$ which is reproducible by an upper level system operating in a 6fsc mode. It will also be seen that the PCM processing circuit 33 and subsystem 40 in cooperation with the system controller 52 serve as a means for recording area discriminating code data in the form of the ID's for identifying predetermined areas of the magnetic tape 1 in which image data having respective data rates $SCK_2$ and $SCK_1$ are recorded.

A still picture reproducing mode of the upper level system VTR of FIG. 3 is initiated by a user through the actuation of an appropriate control (not shown for purposes of simplicity and clarity) which generates a corresponding signal received by the system controller 52 which, in turn, generates further necessary controls signals for governing the operation of the VTR in the selected mode. Accordingly, the subsystem 40 proceeds to reproduce the recorded still picture data from the PCM audio areas of the magnetic tape 1 and provides the same through the multiplexer 41 to the PCM processing circuit 33. Circuit 33 separates and detects sync signals and ID's in the reproduced still picture data and carries out error correction. The error corrected data, which is still in compressed form, are then stored in the RAM 34 and subsequently read therefrom to be supplied to the still picture processing circuit 31. The ID's detected from the reproduced data by the circuit 33 are supplied through the system controller 52.

The circuit 31 processes the compressed data by data expansion to reproduce the image data which it stores in the video RAM 32 under the control of write addresses supplied by the memory controller 53. Such write addresses are produced by the memory controller 53 in response to control signals from the system controller 52 which it generates on the basis of the ID's received from PCM processing circuit 33 so that the reproduced image data will be stored in predetermined regions of the video RAM 32, as explained in greater detail hereinbelow.

When either a complete field or a complete frame of the image data has been stored in the video RAM 32 in the manner described above, the stored data may then be read from the video RAM 32 in response to read out addresses which are synchronized with NTSC-type synchronizing signals provided by the memory controller 53 and the data thus read from the video RAM 32 in the form of NTSC-type video signals are supplied to the still picture video processing circuit 31 which, in turn, provides the same to the digital-to-analog converter 23 through the changeover switch 22. The analog video signals thus produced by the converter 23 are output to a monitor for viewing through the output terminal 26.

The manner in which the system controller 52 controls storage of the image data in the video RAM 32 is explained hereinafter in connection with the flow chart of FIG. 6. In a step ST1a of FIG. 6, the system controller 52 determines whether the data was recorded in a 6fsc mode. If so, the process continues in a step ST2a in which the ID of the reproduced image data is determined by the system controller 52.

Figure 6:
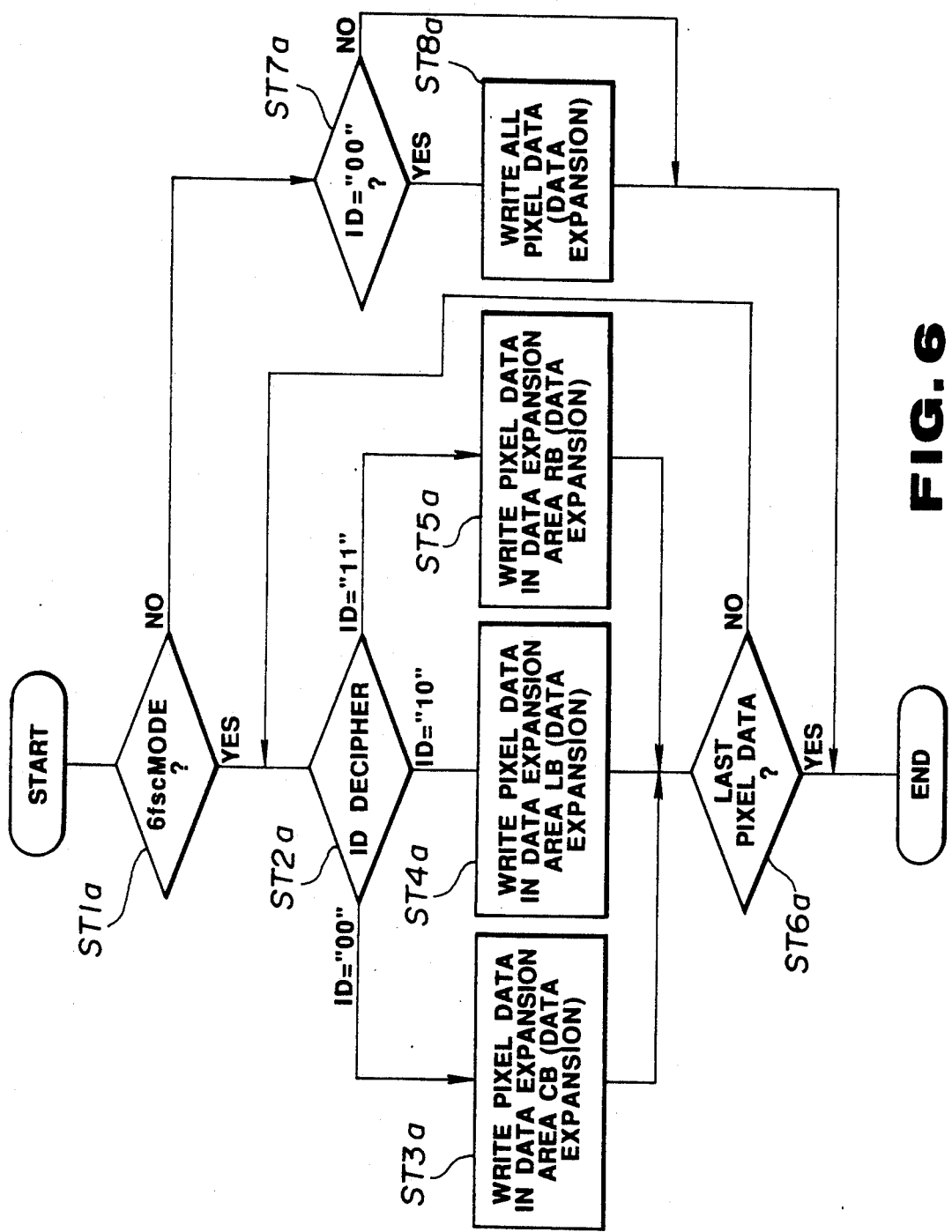
FIG. 6 is a flow chart for illustrating a process for storing still picture data performed in the course of data reproduction by the upper level system of FIG. 3.

In the exemplary process illustrated in FIG. 6, it is assumed that the data was arranged upon recording in the manner illustrated in FIG. 5. Accordingly, if an ID of "00 has been received by the system controller 52, this indicates that the reproduced image data correspond with pixels $a_{i,193}$ through $a_{i,960}$ in the array of FIG. 5. Therefore, the system controller 52 causes the memory controller 53 to generate appropriate write addresses for storing the received data from the circuit 31 in the portion of the video RAM 32 corresponding to the region CB as illustrated in FIG. 5. The system controller 52 then proceeds to step ST6a.

If instead the system controller 52 receives an ID of "10" in the step ST2a, this indicates that the reproduced image data corresponds with the data $a_{i,1}$ through $a_{i,192}$ corresponding to the region LB illustrated in FIG. 5. Accordingly, the controller 52 then proceeds to a step ST4a wherein it causes the memory controller 53 to generate appropriate write addresses for storing the image data from the circuit 31 in a portion of the video RAM 32 corresponding with the region LB as represented in FIG. 5. Thereafter the system controller 52 proceeds to the step ST6a.

However, if the system controller 52 receives an ID of "11" in the step ST2a, this indicates that the image data correspond with the data $a_{i,961}$ through $a_{i,1152}$ of the region RB illustrated in FIG. 5. In that event, the system controller 52 proceeds to a step ST5a wherein it causes the memory controller 53 to generate appropriate write addresses for storing the image data in that portion of the video RAM 32 corresponding with the area RB of the array illustrated in FIG. 5. Once again, the system controller 52 then proceeds to the step ST6a.

In step ST6a the controller 52 determines whether image data constituting an entire field or frame of the still picture has been reproduced from the magnetic tape 1 and stored in the video RAM 32. If so, the controller 52 terminates the process, but if not, the process returns to the step ST2a for deciphering the ID of subsequently received image data in order to continue the storage of the received data in the video RAM 32. In this manner, the video RAM 32 stores the reproduced image data in a manner conforming with their corresponding pixel locations so that the data may subsequently be read from the RAM 32 in proper order for generating an NTSC video signal therefrom which can be viewed with the use of a monitor.

If, however, it is determined in the step ST1a that the image data has been recorded on the tape 1 in the 4fsc mode, the process branches to a step ST7a in which the system controller 52 determines whether the received ID is "00". If not, the ID does not indicate that the accompanying data is reproducible as a still image according to the 4fsc mode, and the process is then terminated. If on the other hand the received ID is "00", this indicates that the reproduced data was recorded as still image data in the 4fsc mode and the controller proceeds to step ST8a.

In step ST8a, the system controller 52 directs that all of the reproduced image data, after expansion by the circuit 31, be stored in the video RAM 32, after which the process is terminated. Accordingly, in this step ST8a the reproduced image data which were recorded in the 4fsc mode are stored as a complete image including 768 samples by 484 lines in the video RAM 32.

Upon completion of the data storage process illustrated in FIG. 6, the stored image data are read from the video RAM 32 as described above under the control of readout addresses provided by the memory controller 53 and synchronized with NTSC-type synchronizing signals preliminary to their conversion into NTSC analog video signals which are suitable for image reproduction by a monitor coupled with the output terminal 26 of the VTR.

Figure 7:
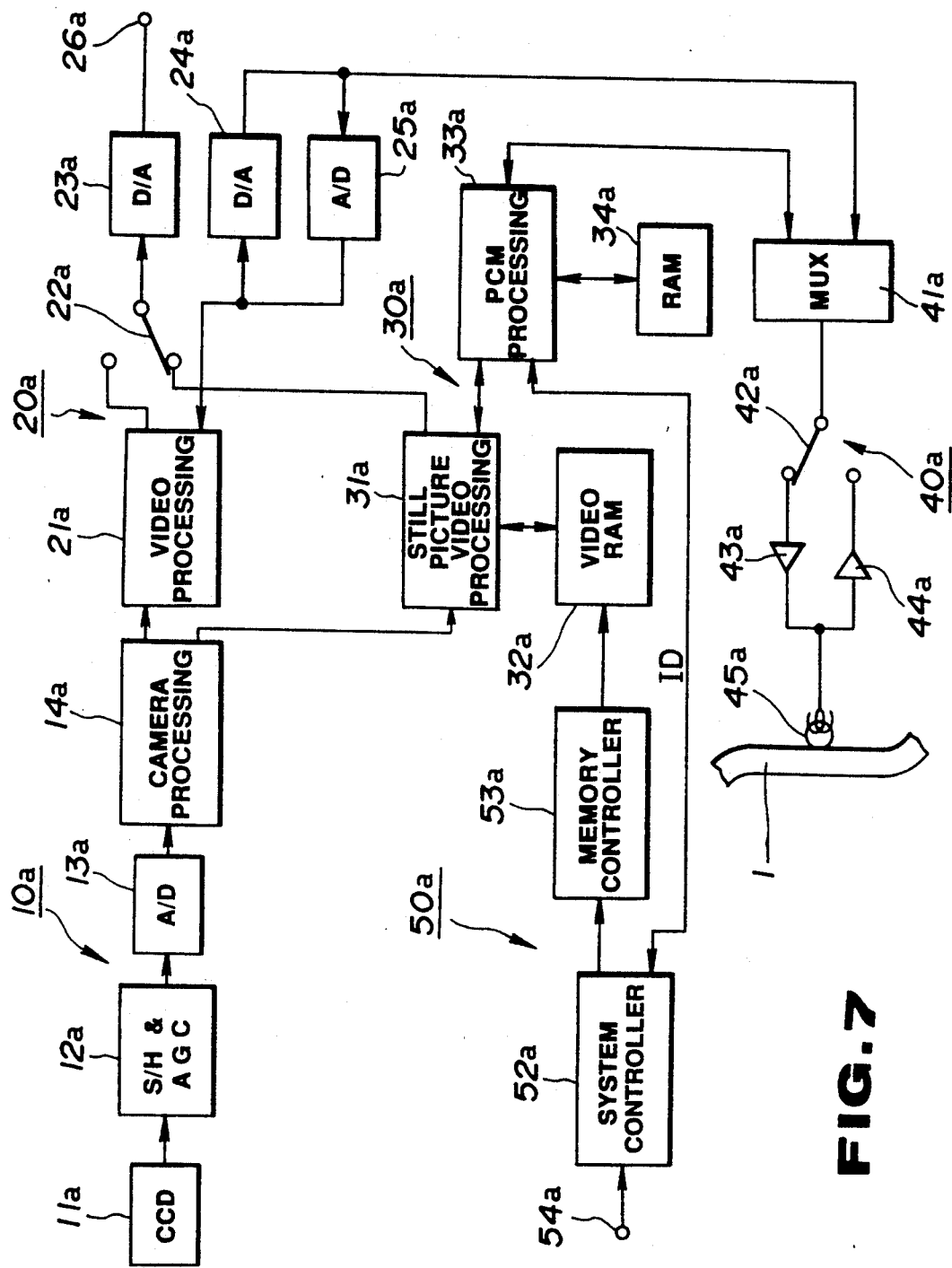
FIG. 7 is a circuit block diagram of an 8 mm VTR having a built in camera and functioning as a lower level system.

A technique by which a lower level system reproduces a still picture recorded on the magnetic tape 1 in the manner described above by an upper level system, is hereinafter explained in connection with the circuit block diagram of a lower level system provided in FIG. 7. The lower level system of FIG. 7 is constructed in a manner similar to that of the upper level system illustrated in FIG. 3, provided however that the lower level system of FIG. 7 is operable only in a 4fsc mode. Accordingly, the lower level system of FIG. 7 includes a camera subsystem 10a including a CCD image sensor 11a, sample-and-hold and automatic gain control circuit 12a, analog-to-digital converter 13a and camera processing circuit 14a operating in the same manner as the corresponding elements of the subsystem 10 in FIG. 3, but which operate solely at a data rate of $SCK_2$ equal to 4fsc.

The lower level system of FIG. 7 also includes a moving picture video signal processing subsystem 20a including a video processing circuit 21a, digital-to-analog converters 23a and 24a and an analog-to-digital converter 25a, and functioning in the same manner as the subsystem 20 of FIG. 3, but operating at a data rate $SCK_2$ for converting digital video signals supplied by the camera subsystem 10a into analog video signals to be recorded on the magnetic tape 1 and for reproducing NTSC analog video signals from RF signals reproduced from the tape 1. The system of FIG. 7 also includes a still picture video signal processing subsystem 30a operable in the same manner as the subsystem 30 of FIG. 3 functioning in the 4fsc- mode, and including a still picture video processing circuit 31a, a video RAM 32a, a PCM processing circuit 33a and a RAM 34a. The subsystem 30a is operative for compressing digital video signals provided in units of fields or frames from the camera subsystem 10a for recording on the tape 1, and operable in a reproduction mode for reproducing still image data reproduced from the tape 1. The system of FIG. 7 finally includes a recording and reproducing subsystem 40a which carries out the same signal multiplexing, amplification and recording functions as the subsystem 40 of FIG. 3 by means of a time division multiplexer 41a, changeover switch 42a, recording amplifier 43a, playback amplifier 44a and recording and reproducing head 45a. Finally, the system of FIG. 7 includes a control subsystem 50a for controlling the still picture video signal processing subsystem 30a by means of a system controller 52a and memory controller 53a operating in the manner described hereinbelow.

Since the lower level system of FIG. 7 operates only at the data rate $SCK_2$, the video RAM 32a has a capacity of only 768 samples by 484 lines by 8 bits. In addition, the still picture video processing circuit 31a is not provided with the capability of forming image data having a sampling rate $SCK_2$ from image data having a data rate $SCK_1$ as in the upper level system of FIG. 3.

Figure 8:
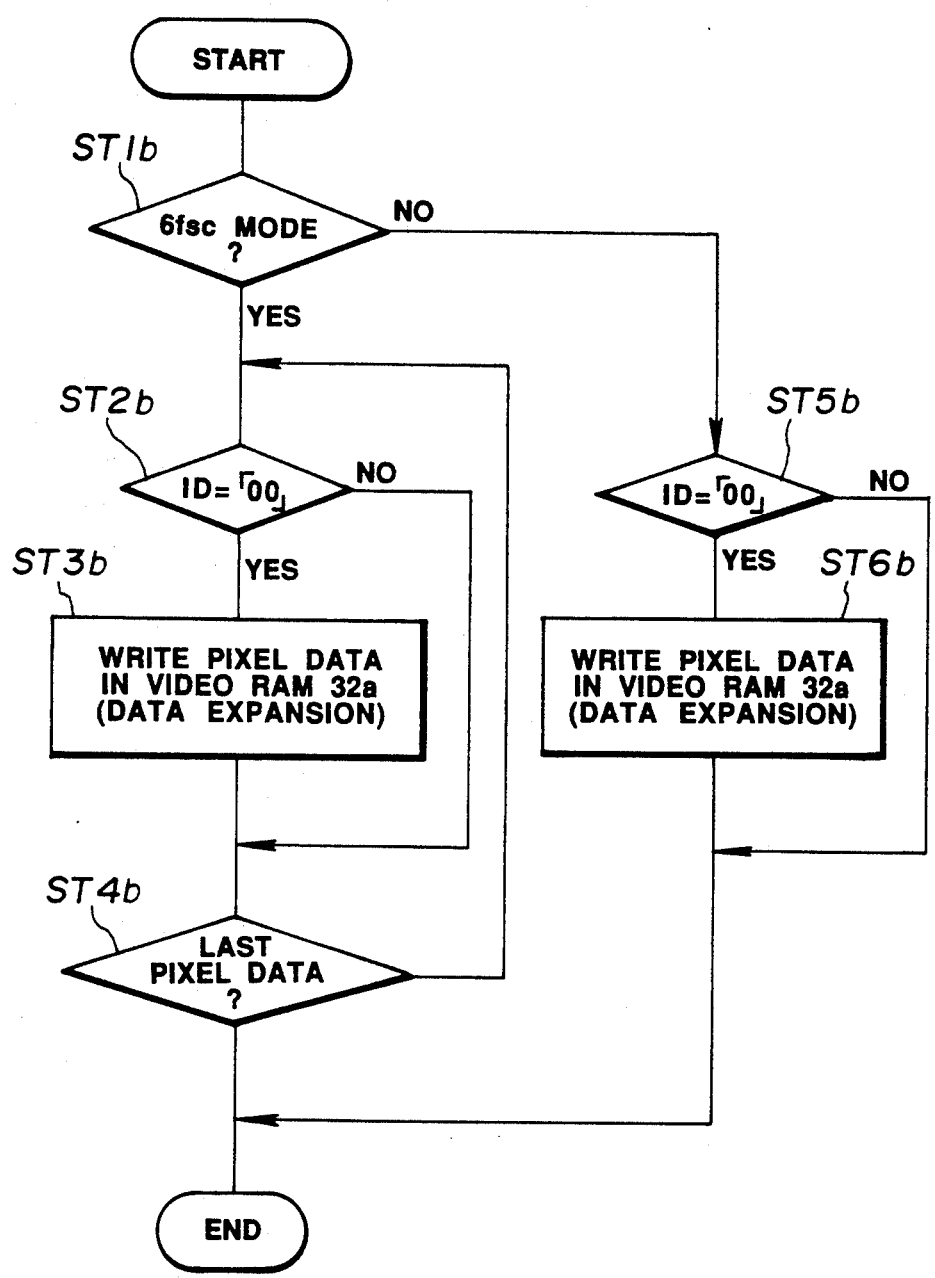
FIG. 8 is a flow chart for illustrating a process for storing still image data performed in the course of a reproduction operation by the lower level system of FIG. 7.

The manner in which the lower level system of FIG. 7 reproduces still image data from the magnetic tape I is explained hereinafter in connection with the flow chart of FIG. 8. The system controller 52a determines in a step ST1b of FIG. 8 whether a 6fsc recording mode was in use when reproduced still image data was recorded. If so, the process continues to a step ST2b in which it is determined by the controller 52a whether the ID of the reproduced image data is "00" indicating that the same corresponds with data reproducible by the lower level system. If so, and assuming that the data was assigned ID's in the manner illustrated in FIG. 5, it is known that the reproduced image data correspond with the pixel data $a_{i,193}$ through $a_{i,960}$ of the FIG. 5 spacial array. Accordingly, in the step ST3b the system controller 52a directs the memory controller 53a to generate write addresses for storing the reproduced image data after expansion by the circuit 31a in the video RAM 32a.

If in step ST2b it is determined that the ID is not "00" or upon completion of the step ST3b, the controller 52a determines in a step ST4b whether the last of the image data has been reproduced. If so, the controller 52a terminates the process, but if not, the controller returns to the step ST2b to process further reproduced image data. Accordingly, in the loop comprised of steps ST2b–ST4b, the system controller 52a utilizes the ID's recorded simultaneously with the image data in order to direct the memory controller 53a to cause the image data necessary for reproduction of the still image by the lower level system to be stored in the video RAM 32a.

If, however, in the step ST1b, the controller 52a determines that the reproduced image data was not recorded in the 6fsc mode, processing continues in a step ST5b to determine whether the corresponding ID is "00". If not, this indicates that the reproduced data is not suitable for still image reproduction by the lower level system of FIG. 7. If, however, the ID is "00" as determined in step ST5b, in a step ST6b the system controller 52a controls storage of the reproduced image data in its entirety in the video RAM 32a before terminating the process illustrated in FIG. 8. That is, since the image data was recorded in the 4fsc mode the reproduced image data may be stored in its totality in the video RAM 32a in a form of a data array of 768 samples by 484 lines.

After the image data have been thus stored in the video RAM 32a as described above, the stored data may then be read out on a line by line basis according to read out addresses produced by the memory controller 53a synchronized with the NTSC standard for conversion into NTSC-type video signals for output to a monitor. Consequentially, the still image recorded in the PCM audio area of the magnetic tape 1 is thus displayed on a monitor screen for viewing. It will be appreciated that, in the foregoing manner, a still image recorded by an upper level system on the magnetic tape 1 at a data rate of SCKI, may be reproduced easily by a lower level system, such as that illustrated in FIG. 7. It will also be appreciated that interchangeability of recordings between upper and lower level systems may thereby be obtained without increasing the complexity of the lower level system.

Figure 9:
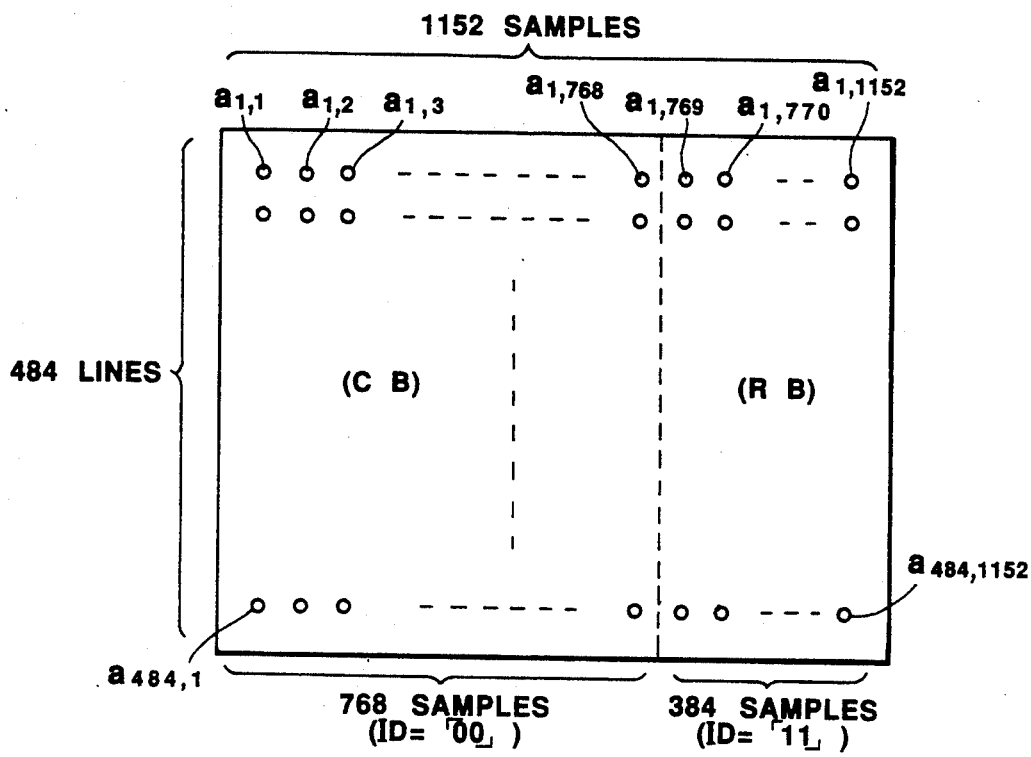
FIG. 9 is a diagrammatic view of a spacial array of pixel data stored in a video memory of the upper level system of FIG. 3 and divided into respective areas in accordance with a second exemplary manner.

With reference now to FIG. 9, a further exemplary manner of dividing high resolution image data generated by an upper level system at a data rate of $SCK_1$ is illustrated therein. As shown in FIG. 9 pixel data $a_{i,1}$ through $a_{i,768}$ correspond with an image area CB representing a left-hand portion of the corresponding image and allocated an ID "00". The remaining image data, namely data $a_{i,769}$ through $a_{i,1152}$ correspond with an image portion RB to the right of the image portion CB and allocated an ID of "11". During reproduction by the lower level system of FIG. 7, therefore, the image data $a_{i,1}$ through $a_{i,768}$ will be stored in the video RAM 32a in response to the ID of "00" for reproducing a still image corresponding with the portion CB.

Figure 10:
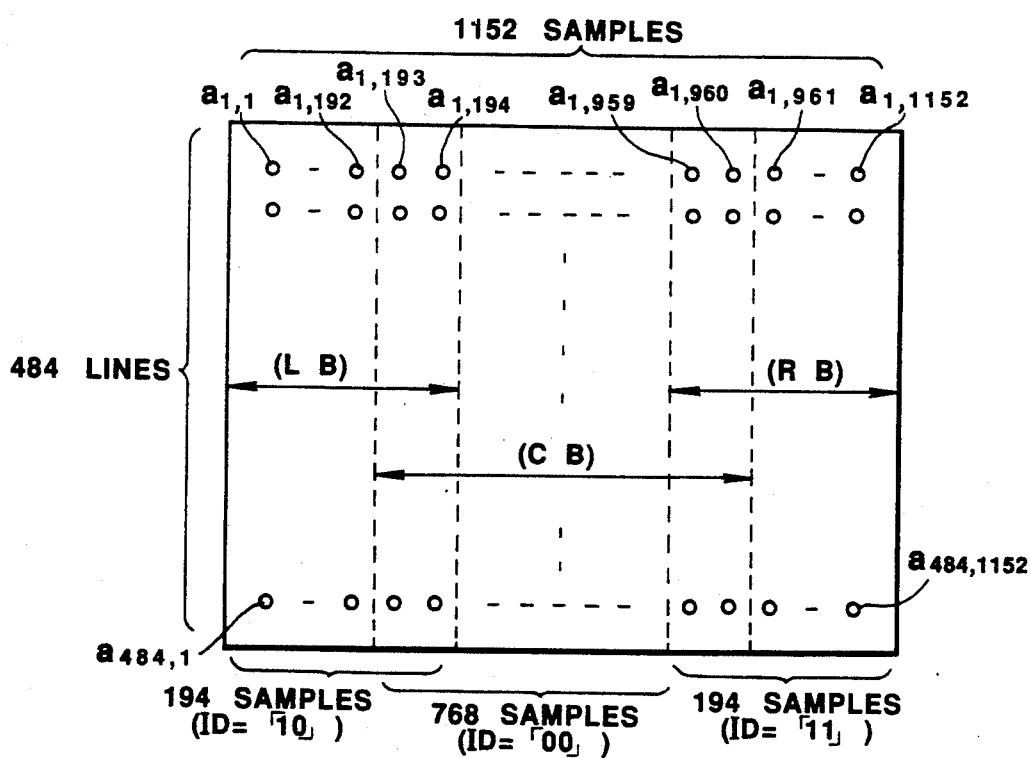
FIG. 10 is a diagrammatic view of a spacial array of pixel data stored in a video memory of the upper level system of FIG. 3 and divided into areas according to a third exemplary manner.

With reference now to FIG. 10, a still further exemplary technique for dividing a spacial array of image data $a_{i,1}$ through $a_{i,1152}$ produced at a sampling rate $SCK_1$ in the 6fsc mode is illustrated therein. As shown in FIG. 10 the spacial array is divided into three areas, namely, an area LB including data $a_{i,1}$ through $a_{i,194}$, area CB including data $a_{i,193}$ through $a_{i,960}$ and an area RB including data $a_{i,959}$ through $a_{i,1152}$. Accordingly, it will be seen that two-pixel overlapping portions exist between the areas LB and CB as both include the data $a_{i,193}$ and $a_{i,194}$, and again between areas CB and RB as both include data $a_{i,959}$ and $a_{i,960}$. Respective ID's "10", "00" and "11" are assigned to the data within the areas LB, CB and RB, respectively.

Accordingly, when reproduction of the recorded still picture data is undertaken by a lower level system, detection thereby of the ID "00" designating the data $a_{i,193}$ through $a_{i,960}$ for reproduction of a still image thereby is facilitated. However, since the data areas overlap, it is possible for an upper level system to carry out filtering operations performed by combining values of adjacent pixels obtained from a single one of the areas LB, CB and RB to provide filtered data for the entirety of the data $a_{i,1}$ through $a_{i,1152}$. That is, data from the areas LB, CB and RB may be processed independently of each other which advantageously includes data filtering operations.

An exemplary data filtering operation may be carried out utilizing the digital filter circuit illustrated in FIG. 11. The filter circuit in of FIG. 11 is provided with a filter input 141 coupled with a series combination of one pixel interval delay devices 142 and 143. The filter circuit of FIG. 11 further includes a multiplier 144 coupled with the output of the delay device 143 and operative to multiply the input data delayed by two-pixel intervals by a coefficient of one quarter, multiplier 145 coupled with the output of the delay device 142 and operative to multiply the input data delayed by one-pixel interval by a coefficient of one half and a multiplier 146 coupled with the input terminal 144 and operative to multiply the input data by a coefficient of one quarter. The filter circuit further includes an adding circuit 147 having a first input terminal coupled with the output of multiplier 144, a second input terminal coupled with the output of multiplier 145 and a third input terminal coupled with the output of multiplier 146 and operative to sum the outputs of the three multipliers which it supplies as output pixel data $b_{i,j}$ to an output terminal 148 of the filter circuit. The filter circuit of FIG. 11, therefore, serves to produce a weighted mean $b_{i,j}$ of three adjacent data $a_{i,j-1}$, $a_{i,j}$ and $a_{i,j+1}$.

In the absence of an overlap between adjacent data areas as illustrated in FIG. 10, it is necessary to combine data from two different areas when carrying out filtering operations at the edges of each area, as illustrated in FIG. 12A. By providing a two-pixel overlap, as illustrated in FIG. 12B, filtering may be carried out with the use of the circuit illustrated in FIG. 11 by combining sequentially available data $a_{i,j}$ even at the edges of the three areas LB CB and RB whereby filtered data representing the entirety of the image may be provided while in all instances utilizing only data from a single area in carrying out each filtering operation. It will be appreciated that the overlapping portions need not be limited to two horizontally adjacent pixels but may be advantageously selected in size to accommodate the filtering technique in use.

Figure 13A:
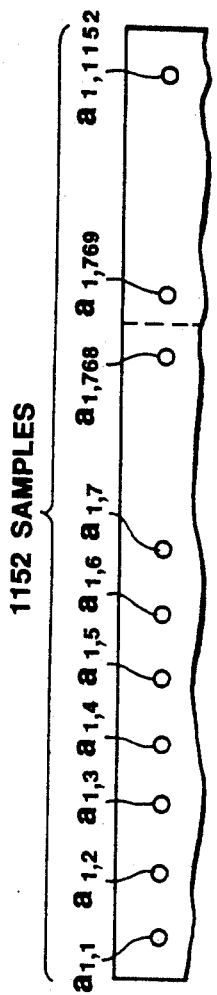
FIGS. 13A, 13B and 13C are diagrammatic views of spacial arrays of pixel data for illustrating a process of forming pixel data having a relatively low data rate by interpolating pixel data having a relatively higher data rate.
Figure 13B:
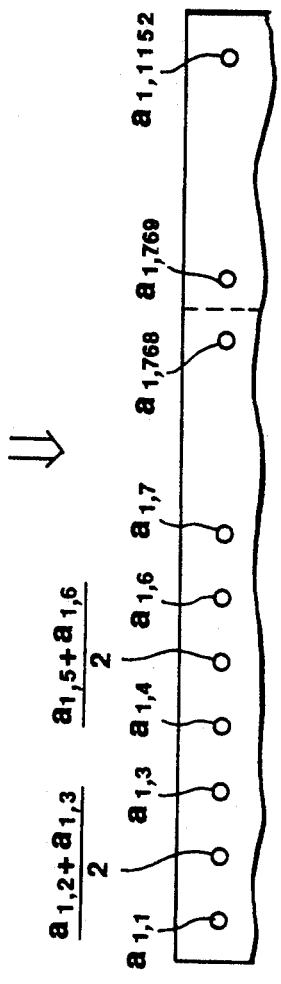
Figure 13C:
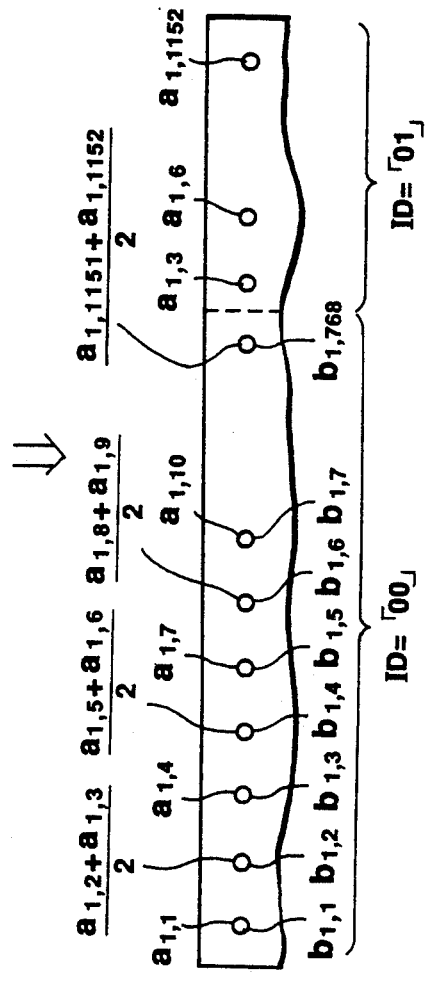

As mentioned hereinabove, it is also possible to form image data reproducible at a lower sampling rate $SCK_2$ by interpolation of pixel data produced by the upper level system having the higher sampling rate $SCK_1$. One example of such an interpolation technique is illustrated in FIGS. 13A through 13C and described hereinbelow. Referring first to FIG. 13A, a first line of image data from an array of 1152 samples by 484 lines is illustrated therein including data values arranged sequentially as $a_{1,1}$ through $a_{1,1152}$. As shown in FIG. 13B, selected ones of the samples $a_{1,1}$ through $a_{1,1152}$ are combined by interpolation and substituted for predetermined ones of the samples. For example, as shown in FIG. 13B sample $a_{1,2}$ has been replaced by an interpolated value $(a_{1,2}+a_{1,3})/2$. It will be appreciated, however, that the values of the selected samples which have been replaced by interpolated values may be recovered through a linear combination of the interpolated values and certain ones of the uninterpolated sample values. For example, the value of sample $a_{1,2}$ may be recovered by a linear combination of the interpolated value $(a_{1,2}+a_{1,3})/2$ and the sample $a_{1,3}$, as discussed in greater detail hereinbelow.

As a final step in this process, the data as illustrated in FIG. 13B is rearranged so that the data $a_{i,3k}$, where k is an integer, are removed to a separate data area assigned an ID of "01", whereas the remaining data are assigned an ID of "00" thus to form a data area identified by the ID of "00" including corresponding values $b_{p,q}$ where $p=1$ to 484 and $q=1$ to 768, as illustrated in FIG. 13C. It will appreciated that the data area identified by the ID of "00" is dimensioned appropriately for reproduction by a lower level system operating at a data rate of $SCK_2$. It will also be appreciated, therefore, that the data $b_{p,g}$ is derived in the process illustrated by FIGS. 13A through 13C according to the following formulae:

$$b_{p,q}=a_{i,3k-2} \text{ for } q=2k-1;$$

$$b_{p,q}=(a_{i,3k-1}+a_{i,3k})/2 \text{ for } q=2k.$$

It will be further appreciated that still other interpolation techniques may be employed for deriving the data $b_{p,q}$; for example, interpolation may carried out according the following formula instead of the foregoing formulae:

$$b_{p,q}=(a_{i,3k-2}+3a_{i,3k-1}+3a_{i,3k}+a_{i,3k+1})/8$$

Figure 14:
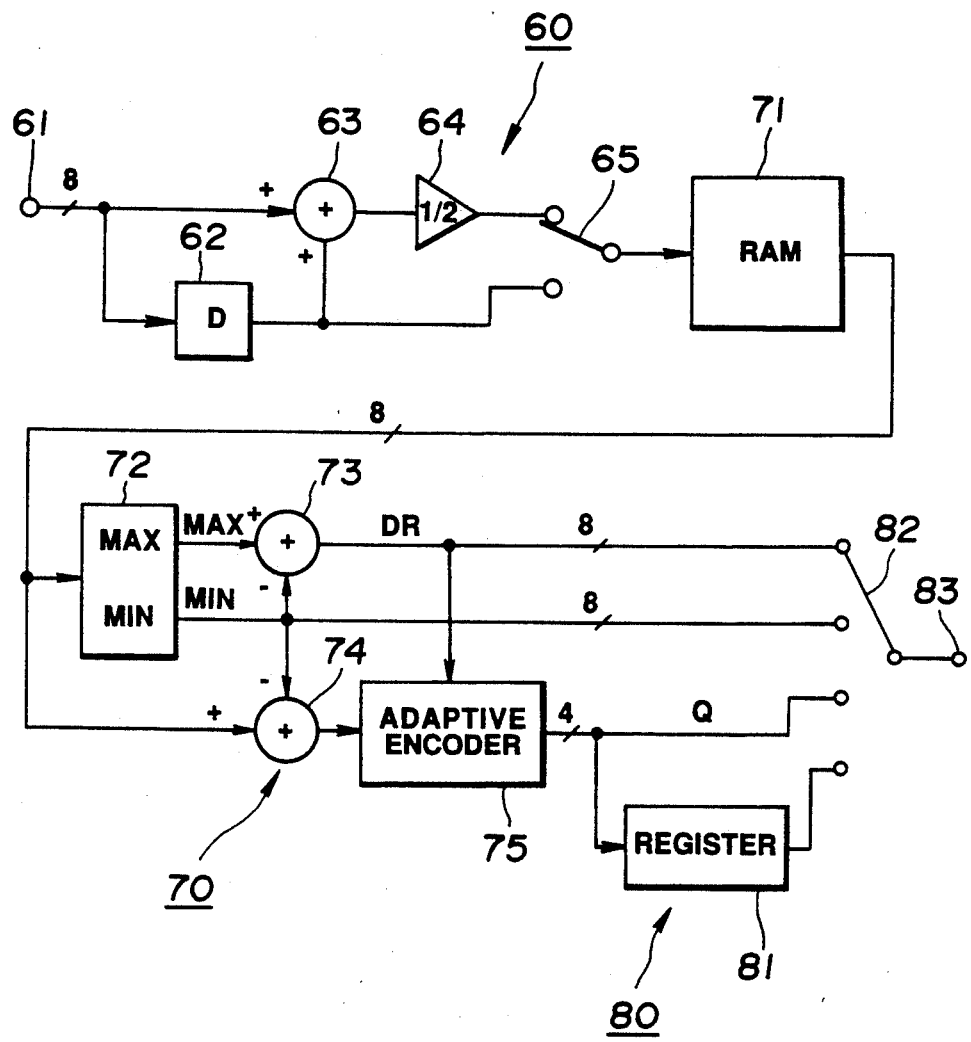
FIG. 14 is a circuit block diagram of a still video data processing circuit for forming pixel data having a relatively low data rate by interpolation of pixel data having a relatively higher data rate and for data compression of the so-formed pixel data.

In certain advantageous embodiments, the still picture video processing circuit 31 of FIG. 3 includes a data processing circuit as illustrated in FIG. 14 which serves to carry out the interpolation process illustrated in FIGS. 13A through 13C as well as to carry out adaptive dynamic range coding of the image data to achieve data compression. The data processing circuit of FIG. 14 includes an interpolating circuit 60 which serves to form pixel data reproducible at a data rate of $SCK_2$ from image data having a data rate $SCK_1$ by interpolation of certain ones of the image data. The circuit of FIG. 14 further includes an adaptive dynamic range coding (ADRC) circuit 70 for carrying out adaptive dynamic range coding of data supplied by the interpolating circuit 60, and a rearraying circuit 80 for rearranging the compressed data supplied by the ADRC circuit 70 in accordance with a predetermined format.

More particularly, the interpolation circuit 60 has an input terminal 61 coupled with the input of a delay device 62 which serves to delay input data having 8 bits per pixel and supplied from the video RAM 32 of FIG. 3 by one-pixel interval, an adding circuit 63 having a first input coupled with the input terminal 61 and a second input coupled with the output of the delay device 62, a multiplier 64 having an input coupled with an output of the adding circuit 63 and operative to multiply the output thereof by a coefficient of one half and a selector 65 having a first fixed terminal coupled with an output of multiplier 64, a second fixed terminal coupled with the output of the delay device 62 and a moveable terminal at which the output of the interpolating circuit 60 is provided.

The ADRC circuit 70 includes a RAM 71 for temporarily storing image data supplied by the interpolating circuit 60. The circuit 70 also includes a maximum/minimum detection circuit 72 coupled with a data output of the RAM 71 and operative to detect a maximum value and a minimum value of a block of image data read from the RAM 71 thus to produce respective maximum value data MAX and minimum value data MIN. Also included in the circuit 70 is a subtracting circuit 73 having a non-inverting input coupled with circuit 72 to receive the maximum value data MAX therefrom and an inverting input coupled with the circuit 72 to receive the minimum value data MIN therefrom and operative to produce dynamic range data DR for each block by subtracting the minimum value data MIN thereof from the maximum value data MAX thereof. Circuit 70 further includes a subtracting circuit 74 having a non-inverting input coupled with the output of the RAM 71 and an inverting input coupled with the circuit 72 to receive the minimum value data MIN therefrom and operative to provide difference data at an output thereof representing the difference between the values of each of the image data in a given block and the minimum value data MIN thereof. Circuit 70 still further includes an adaptive encoder 75 supplied with the dynamic range data DR of each block from the output of the subtracting circuit 73 and the difference values from the output of the subtracting circuit 74 and operative to quantize the difference values of each block based on the dynamic range data DR thereof to supply the quantized difference values as quantized data Q.

The rearraying circuit 80 includes a register 81 operative to store a predetermined number, namely, 384, of the quantized data Q supplied by the adaptive encoder 75 of the ADRC circuit 70 and a selector 82 operative to provide a selected one of the dynamic range data DR, the minimum value data MIN, the quantized data Q from the ADRC circuit 70 and the quantized data Q from the register 81 at a given instant to an output terminal 83 of the circuit of FIG. 14.

Figure 15A:
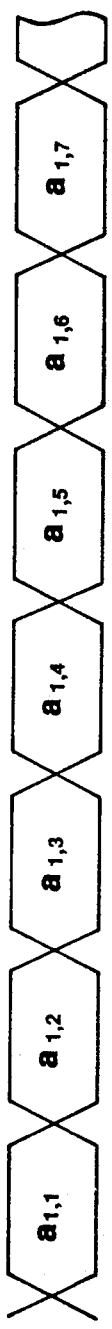
FIGS. 15A through 15D are timing charts for illustrating the interpolation process carried out by the data processing circuit of FIG. 14.
Figure 15B:
Figure 15C:
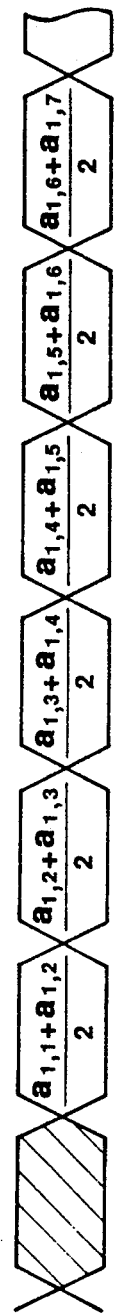
Figure 15D:

The operation of the circuit of FIG. 14 is described hereinbelow in conjunction with FIGS. 15A through 15D, 16 and 17. The digital video signals as supplied from the camera subsystem 10 of the VTR of FIG. 3 constituting a single frame of an image are supplied in line-sequential fashion in accordance with the NTSC system. The pixel data as thus supplied are illustrated in FIG. 15A as the data $a_{i,j}$ where i indicates a line number of from 1 to 484 and j indicates a sequence or order of the pixels within each line. The data $a_{i,j}$ are supplied via terminal 61 of the FIG. 14 circuit to the input of the delay device 62 and to a first summing input of the adding circuit 63. As shown in FIG. 15B, the data $a_{i,j}$ as supplied by the delay device 62 are delayed by one-pixel interval. The adding circuit 63 and the multiplier 64 cooperate to form interpolated data at the output of multiplier 64 by adding a delayed pixel $a_{i,j}$ with a currently received pixel $a_{i,j+1}$ and multiplying the sum by a coefficient of one half thus to produce interpolated data $(a_{i,j}+a_{i,j+1})/2$ as illustrated in FIG. 15C which are supplied to the first fixed input terminal of the selector 65. With reference also to FIG. 15D, it will be seen that the selector 65 selects the pixel data $a_{i,j}$ from the delay device 62 and the interpolated data $(a_{i,j}+a_{i,j+1})/2$ from the multiplier 64 at a ratio of 2:1 and supplies the selected pixel data to the RAM 71.

Figure 16:
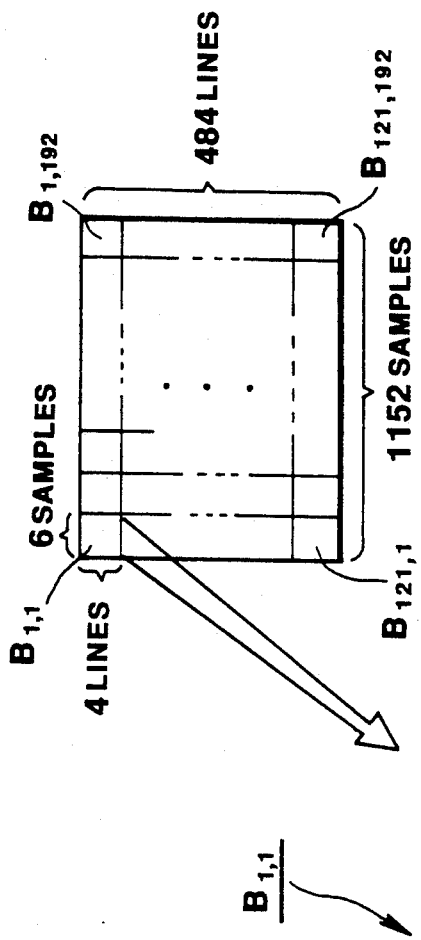
FIG. 16 is a diagrammatic view of a spacial array of pixel data arranged in blocks of data to enable data compression by adaptive dynamic range coding.

RAM 71 stores the selected pixel data from selector 65 sequentially to form a spacial array of data constituting 1152 samples by 484 lines of pixel data as illustrated in FIG. 16. The memory controller 53 of FIG. 3 generates readout addresses which it supplies to the RAM 71 to cause the pixel data stored therein to be read out in blocks $B_{m,n}$ each including a rectangular array of six samples by four lines where m=1 to 121 and n=1 to 192 which are supplied to the maximum and minimum circuit 72 and subtracting circuit 74. As noted above, the circuit 72 produces the maximum value data $MAX_{m,n}$ and the minimum value data $MIN_{m,n}$ respresenting the maximum and minimum values among the 24 pixels in each corresponding block $B_{m,n}$ and supplies these values as described above to the subtracting circuits 73 and 74 and selector 82.

The adaptive encoder 75 quantizes the difference data of each block supplied by the subtracting circuit 74 with for example, 0-4 bits, depending on the corresponding dynamic range data $DR_{m,n}$ and supplies the quantized data to the register 81 and the selector 82. More specifically, the pixel data $a_{i,j}$ are each converted into from 0-4 bits of quantized data $Q_{i,j}$ while the interpolated data $(a_{i,j}+a_{i,j+1})/2$ are each converted into from 0 to 4 bits of quantized data $(Q_{i,j}+Q_{i,j+1})/2$. In the foregoing manner, the ADRC circuit carries out a compression of the pixel data and the interpolated data.

Figure 17:
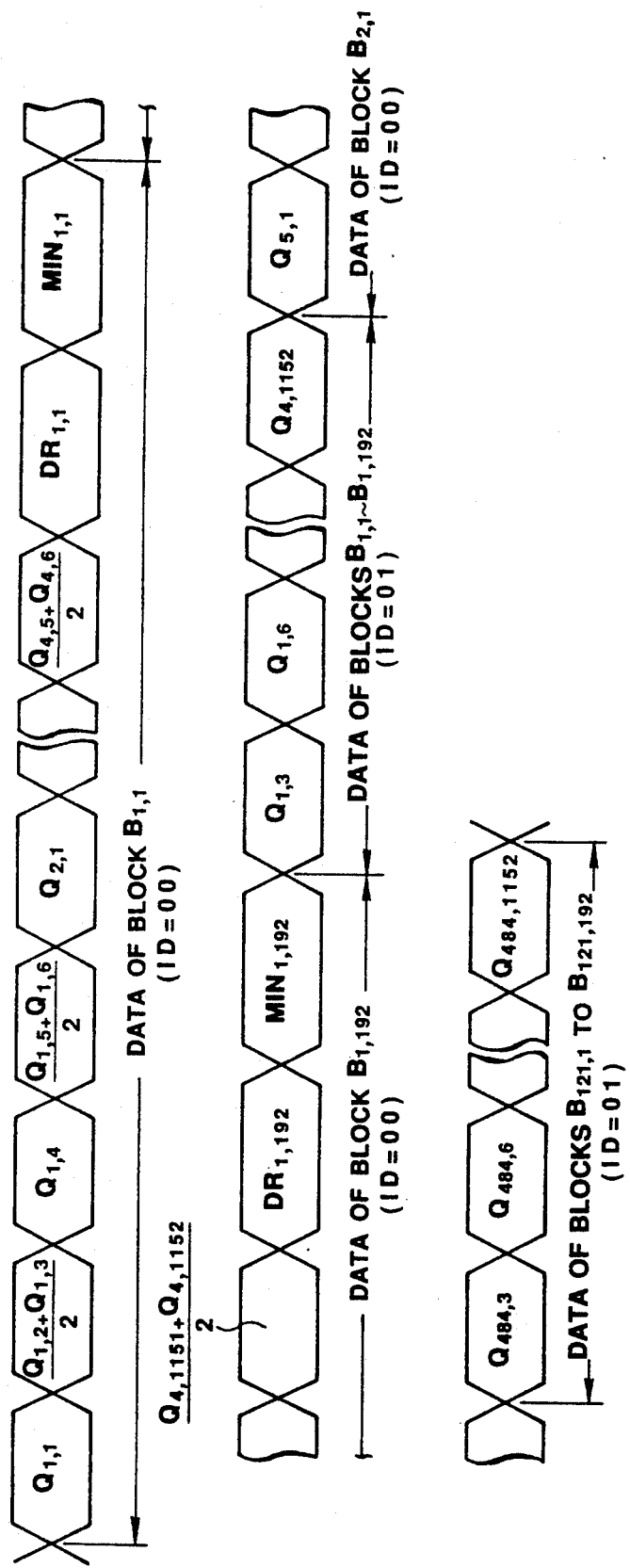
FIG. 17 is a timing chart for illustrating the operation of a data rearranging circuit included in the data processing circuit of FIG. 14.

The register 81 of the rearraying circuit 80 has a capacity of 4 bits by 384 stages by 4 lines in order to store the quantized data $Q_{i,3k}$, where k is an integer, in order to store all of the quantized data of the blocks $B_{i,1}$ through $B_{i,192}$ which is to be assigned an ID "01" and which, thus, will not be reproduced by a lower level system. The operation of the register 81 is controlled in accordance with clock signals provided by the memory controller 53 of FIG. 3. The selector 82 of the rearraying circuit 80 serves to arrange quantized data $Q_{i,j}$ and $(Q_{i,j}+Q_{i,j+1})/2$ from the adaptive encoder 75, the dynamic range data $DR_{m,n}$ from the subtracting circuit 73 and the minimum value data $MIN_{m,n}$ from the circuit 72, under the control of the memory controller 53 of FIG. 3. More specifically, as illustrated in FIG. 17, the selector 82 arrays the quantized data $Q_{i,j}$ and $(Q_{i,j}+Q_{i,j+1})/2$, with the exception of $Q_{i,3k}$, where k is an integer, for each of the first four lines, together with the dynamic range data $DR_{m,n}$ and minimum value data $MIN_{m,n}$ where m=1 and n=1 to 192, that is, for the blocks $B_{1,1}$ through $B_{1,192}$ as illustrated in FIG. 16 and which bear the ID of "00", which are thus reproducible both by upper and lower level systems after recording on the magnetic tape 1. The selector 82 then arrays the quantized data $Q_{i,3k}$ of the blocks $B_{1,1}$ through $B_{1,192}$ which are assigned an ID "01" as shown in FIG. 17 and which are, thus, not to be reproduced by the lower level system. This process is repeated until all of the blocks $B_{m,n}$ where m=1 to 121 and n=1 to 192 have been thus arrayed.

The rearrayed data as provided by the selector 82 are supplied by the output terminal 83 to the PCM processing circuit 33 of FIG. 3. The PCM processing circuit 33 proceeds to append the ID's "00" and "01" to the data as noted above and as indicated in FIG. 17, and supplies the thus appended data to the multiplexer 41 of subsystem 40. The subsystem 40 proceeds to record the data thus supplied by the circuit 33 in the PCM audio areas of the magnetic tape 1.

Figure 18:
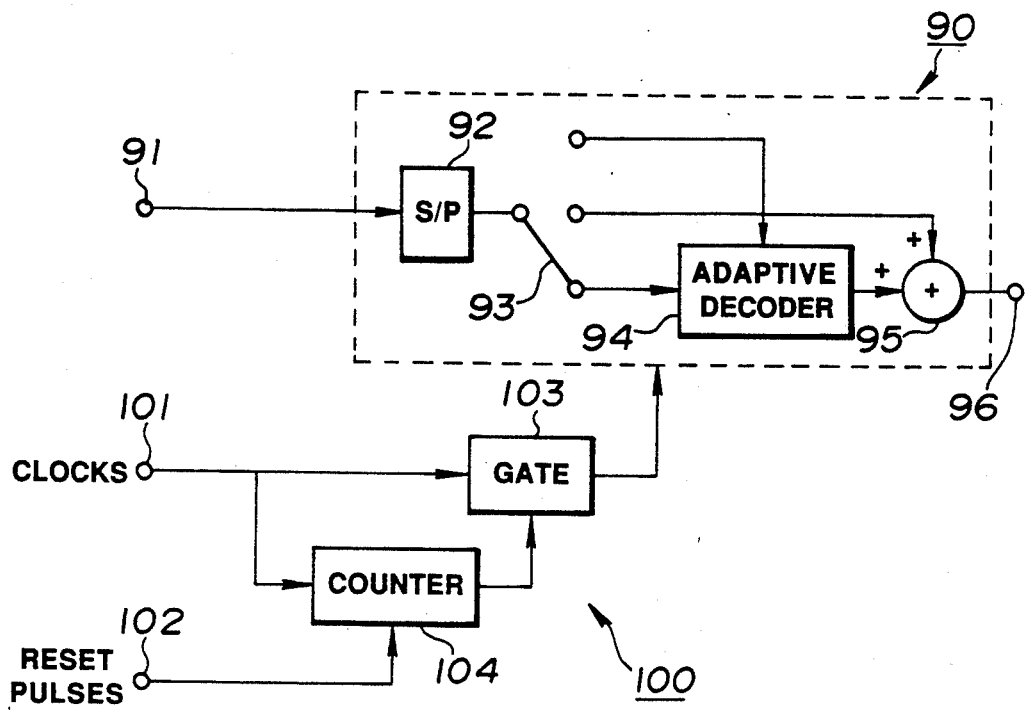
FIG. 18 is a circuit block diagram of a decoding circuit for adaptive dynamic range decoding provided in a still picture video processing circuit of a lower level system.

A technique for reproducing interpolated data recorded by an upper level system in the manner described above in connection with FIGS. 14 through 17 with the use of a lower level system of the type illustrated in FIG. 7 is explained hereinafter in connection with FIG. 18. Referring to FIG. 18, a data processing circuit provided in certain advantageous embodiments of the still picture video processing circuit 31a of FIG. 7 is illustrated therein. The circuit of FIG. 18 includes an adaptive dynamic range decoding circuit 90 operating under the control of a control circuit 100 in order to reproduce the image data $b_{p,q}$, where p=1 to 484 and q=1 to 168, which are utilized by the lower level system operating at a data rate of $SCK_2$.

More particularly, the circuit 90 includes a serial to parallel converter 92 for converting the quantized data $Q_{i,j}$ and the quantized interpolated data $(Q_{i,j}+Q_{i,j+1})/2$ together with the dynamic range data $DR_{m,n}$ and the minimum value data $MIN_{m,n}$ which are received at the terminal 91 in serial format into a parallel format. The circuit 90 also includes a changeover switch 93 coupled with an output of the converter 92 operative to supply the quantized data $Q_{i,j}$ and the quantized interpolated data $(Q_{i,j}+Q_{i,j,1})/2$ at a first fixed terminal thereof, the dynamic range data $DR_{m,n}$ at a second fixed terminal thereof and the minimum value data $MIN_{m,n}$ at a third fixed terminal thereof. The circuit 90 further includes an adaptive decoder 94 coupled with the first and second fixed terminals of the changeover switch 93 to receive the quantized data, quantized interpolated data and dynamic range data therefrom and operative to decode the quantized data and quantized interpolated data which it then supplies to a first input of an adding circuit 95 having a second input coupled with the third fixed terminal of the switch 93 to receive the minimum value data $MIN_{m,n}$ which is added to the decoded data to reproduce the image data $b_{p,q}$.

The control circuit 100 includes a gate circuit 103 which is operative to gate clocking signals supplied via a clock input terminal 101 to the circuit 90 under the control of a signal supplied by a counter 104. The counter 104 is operative to count the clock signals received at the terminal 101 and is reset by a reset pulse received thereby from a reset input terminal 102. The reset pulse is provided at the terminal 102 from the system controller 52a of FIG. 7 upon the first detection of the ID "00" in the reproduction mode, whereupon the counter 104 is initialized. Counter 104 then proceeds to count a predetermined number of clock signals corresponding with an interval during which the quantized data, quantized interpolated data, dynamic range data, and minimum value data which are required by the lower level system to reproduce the data $b_{p,q}$ are received. At this time, the gate circuit 103 is enabled to pass the clock signals supplied via terminal 101 to the circuit 90 for this purpose. The counter 104 also serves to count the number of tracks in which the data so required by the lower level system are recorded.

The adaptive decoder 94 receives the clock signals from the gate 103 which control the adaptive decoding thereby of each of the quantized data and quantized interpolated data in each respective block $B_{m,n}$ to supply decoded difference data to the first input of the adding circuit 95. The circuit 95 adds the minimum value data $MIN_{m,n}$ to the decoded data in order to reproduce the image data $a_{i,j}$ and the interpolated data $(a_{i,j}+a_{i,j+1})/2$ corresponding with the image data $b_{p,q}$ which is utilized by the lower level system. As thus reproduced, the data $b_{p,q}$ are supplied via the output terminal 96 to video RAM 32a of FIG. 7.

In the lower level system, therefore, the control circuit 100 operates the circuit 90 in response to the ID's to produce the image data $b_{p,q}$ useable by the lower level system. It will be appreciated that the circuit of FIG. 18 is able to produce the image data $b_{p,q}$ without the need to employ circuitry to derive such data by carrying out an inverse of an interpolation process, so that the lower level system is thereby advantageously simplified.

The image data recorded on the magnetic tape 1 by the upper level system as illustrated hereinabove in connection with FIGS. 14 through 17 is likewise reproducible by the upper level system with the use of the data processing circuit illustrated in FIG. 19 which is included in certain advantageous embodiments of the still picture processing circuit 31 of FIG. 3. The data processing circuit of FIG. 19 serves to carry out an operation which is the inverse of the above described interpolation process, in addition to decoding the quantized data reproduced from the tape 1. Accordingly, the data processing circuit of FIG. 19 includes a rearraying circuit 110 which serves to rearray the quantized data $Q_{i,j}$ and quantized interpolated data $(Q_{i,j}+Q_{i,j+1})/2$ in the manner illustrated in FIG. 16 for the corresponding image data. The data processing circuit of FIG. 19 further includes a circuit 120 which carries out adaptive dynamic range decoding and a deinterpolating circuit 130 which serves to reproduce the image data $a_{i,j}$ having the data rate $SCK_1$ from the decoded data produced by the circuit 120. More particularly, the rearraying circuit 110 includes a serial to parallel converter 112 for converting the quantized data, quantized interpolated data, dynamic range data and minimum value data supplied in serial form at an input terminal 111 into parallel form. An output of the converter 112 is coupled with a RAM 113 to supply the parallel data thereto which it stores temporally before decoding by the circuit 120.

The circuit 120 includes a changeover switch 121 having a moveable terminal coupled with a data output of the RAM 113 and having first and second fixed terminals coupled with an adaptive decoder 122 to supply the quantized data, quantized interpolated data and dynamic range data thereto. The decoder 122 serves to decode the quantized data and the quantized interpolated data based on the dynamic range data and supplies the decoded data to a first input of an adding circuit 123. The changeover switch 121 has a third fixed terminal coupled with a second input of the adding circuit 123 to provide the minimum value data thereto.

The deinterpolating circuit 130 includes a delay device 131 coupled with an output of the summing circuit 123 and operative to delay data supplied thereto by one pixel interval. An output of the delay device 131 is coupled with an input of a multiplier 132 and a first fixed terminal of a selector switch 135. The multiplier 132 is operative to multiply the delayed data from the device 131 by a coefficient of two and outputs the multiplied data to a non-inverting input of a subtracting circuit 134. An inverting input of the subtracting circuit 134 is coupled with the output of the adding circuit 123 and an output of the subtracting circuit 134 is coupled with a second fixed terminal of the selector switch 135. A moveable terminal of the selector switch 135 is coupled with an output terminal 136 of the deinterpolating circuit 130, so that the selector switch 135 is operative to provide thereto either the output of delay device 131 or that of the subtracting circuit 134.

The quantized data $Q_{i,j}$ and quantized interpolated data $(Q_{i,j}+Q_{i,j+1})/2$, the dynamic range data $DR_{m,n}$ and the minimum value data $MIN_{m,n}$ are supplied as serial data in the form illustrated in FIG. 17 to the input terminal 111 from the PCM processing circuit 33 of FIG. 3. The serial to parallel converter 112 converts the received data into parallel data which it supplies to the RAM 113 for storage temporally therein. The RAM 113 stores the data $Q_{i,j}$ and $(Q_{i,j}+Q_{i,j+1})/2$ in a manner corresponding with the spacial positions of their respective image data $a_{i,j}$ and $(a_{i,j}+a_{i,j+1})/2$ as illustrated in FIG. 16. On a block by block basis, the quantized data, quantized interpolated data and the dynamic range data are read from the RAM 113 and supplied via the changeover switch 121 to the adaptive decoder 122, while the minimum value data of each block is supplied via the changeover switch 121 to the adding circuit 123.

The adaptive decoder 122 serves to decode the quantized data and quantized interpolated data in each respective block $B_{m,n}$ based on the dynamic range $DR_{m,n}$ thereof to provide decoded difference data to the adding circuit 123. The adding Circuit 123 thereupon adds the corresponding minimum value $MIN_{m,n}$ to the decoded difference data to reproduce the image data $a_{i,j}$ and $(a_{i,j}+a_{i,j+1})/2$ as illustrated in FIG. 16, which in turn are supplied by the adding circuit 123 to the delay device 131 and the subtracting circuit 134 of the deinterpolating circuit 130.

The delay device 131 delays the image data $a_{i,j}$ and interpolated data $(a_{i,j}+a_{i,j\ 1})/2$ by one pixel interval as supplied thereby to the multiplier 132. It will be apparent, for example, that when the image data $a_{1,3}$ is supplied at the output of the adding circuit 123 to the inverting input of the subtracting circuit 134, the non-inverting input thereof receives the delayed and multiplied interpolated data $((a_{1,2}+a_{1,3})/2)\times 2$, so that the subtracting circuit 134 supplies the reproduced image data $a_{1,2}$ at the output thereof Accordingly, the original pixel data $a_{i,j}$ is recovered by the deinterpolating circuit 130 from the interpolated data $(a_{i,j}+a_{i,j+1})/2$ and the image data $a_{i,j+1}$ At other times the selector switch 135 selects the image data $a_{i,j}$ which was not replaced by interpolated data when recorded on the magnetic tape 1 from which it is now reproduced by the upper level system. The reproduced image data $a_{i,j}$ is supplied by the selector switch 135 via the output terminal 136 to the video RAM 32 of FIG. 3.

Figure 19:
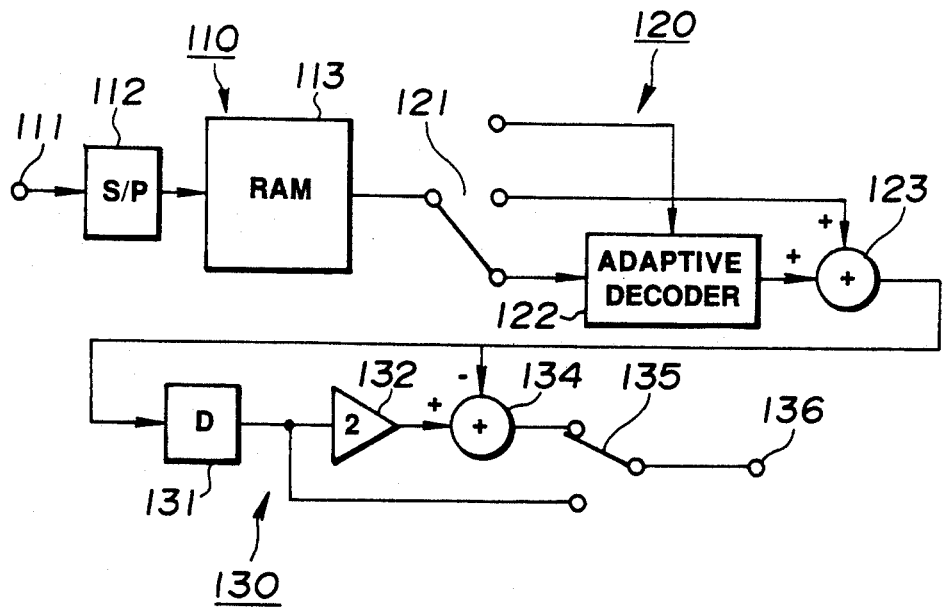
FIG. 19 is a circuit block diagram of a circuit for adaptive dynamic range decoding and deinterpolation provided in a still picture video processing circuit of an upper level system.

While it is necessary in the circuit of FIG. 19 to provide the RAM 113 for rearraying the quantized data and to provide the deinterpolating circuit 130 to reconstruct the original data $a_{i,j}$ from the interpolated data, it will be appreciated that the upper level system does not become unduly complex as a consequence since it is intrinsically a highly functional and expensive apparatus.

According to the disclosed embodiments of the present invention, second image data having a data rate $SCK_2$ are formed from first image data having a relatively higher data rate $SCK_1$ by means of the still image video processing circuit 31 and the video RAM 32 of FIG. 3. The recording and reproducing subsystem 40 of FIG. 3 records the second image data together with at least a portion of the first image data on the magnetic tape 1, as well as corresponding area-discriminating ID's in the respective recording areas of the first and second image data on the tape 1, the area-discriminating ID's being produced by the system controller 52 and PCM processing circuit 33 of FIG. 3. Accordingly, recordings made in the foregoing manner on the magnetic tape 1 by an upper level system may be reproduced by a lower level system operating at a slower data rate, thus to achieve interchangeability of recordings between upper and lower level systems. This capability is realized without the necessity to provide processing circuitry, such as an interpolator, to form the image data having a suitably low data rate from image data produced by the upper level system having a higher data rate, since the accompanying ID's recorded on the tape permit the ready selection of image data in a form which may be reproduced by the lower level system.

It will be appreciated that the signal processing functions of the present invention may be carried out either by hardwired circuits or with the use of a microprocessor, microcomputer or the like. It will also be appreciated that the flow charts shown in the figures and described herein are intended to provide general explanations of the manner in which the disclosed apparatus operate. The particular steps as set out in these flow charts may be varied; their particular order or sequence may be modified; and various steps may be omitted or added.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for recording image data on a recording medium, comprising:
   image conversion means for converting an image into a first image data array consisting of a first plurality of data elements, and which represents said image;
   data forming means for forming a second image data array from the first image data array, said second image data array representing at least some of said image and consisting of a second plurality of data elements that has fewer data elements than said first plurality of data elements;
   data recording means for recording the second image data array and at least a portion of the first image data array in predetermined areas of said recording medium, said portion of the first image data array recorded on said recording medium and said second image data array together representing all of the first image data array; and
   area discriminating code recording means for recording respective area discriminating code data in said predetermined areas on said recording medium for identifying said predetermined areas in which said second image data array and said portion of the first image data array are recorded.

2. The apparatus of claim 1, wherein the data forming means forms at least some elements of the second image data array by selecting predetermined elements of the first image data array as said at least some elements of the second image data array.

3. The apparatus of claim 1, wherein the data forming means forms said at least some elements of the second image data array by selecting the predetermined elements of the first image data array as a plurality of elements of said first image data array representing a predetermined portion of said image.

4. The apparatus of claim 1, wherein the data forming means forms at least some of said portion of the first image data array by selecting predetermined elements of the first image data array representing a further portion of said image other than the predetermined portion thereof.

5. The apparatus of claim 4, wherein the data forming means forms at least some of said portion of the first image data array by including therein predetermined elements of the first image data array representing an edge section of said predetermined portion of said image contiguous with said further portion of said image.

6. The apparatus of claim 1, wherein the data forming means forms at least some elements of the second image data array by interpolating predetermined elements of the first image data array.

7. The apparatus of claim 6, wherein the data forming means forms at least some other elements of the second image data array by selecting predetermined elements of the first image data array as said at least some other elements of the second image data array.

8. The apparatus of claim 7, wherein the data forming means forms said portion of the first image data array such that at least some elements of the first image data array not included in said portion of the first image data array are represented by said at least some elements of the second image data array formed by interpolation of predetermined elements of the first image data array and elements included within said portion of the first image data array.

9. The apparatus of claim 1, wherein the data forming means divides the first image data array into a plurality of blocks of elements representing adjacent portions of said image, carries out adaptive dynamic range coding of each block to form compressed data and divides the compressed data into first and second groups of data as the second image data array and the portion of the first image data array, respectively.

10. The apparatus of claim 9, wherein the data forming means forms interpolated image data from the first image data array and divides the first image data array and the interpolated image data into said plurality of blocks of elements.

11. The apparatus of claim 1, wherein the data forming means comprises memory means for storing the second image data array in predetermined second image data locations therein, and means for reading the second image data array from the memory means at predetermined times for recording in at least one of the predetermined areas of said recording medium.

12. The apparatus of claim 1, wherein the area discriminating code recording means appends respective area discriminating code data to the elements of the second image data array and to the elements of said portion of the first image data array prior to the recording thereof on the recording medium.

13. A method of recording image data on a recording medium, comprising the steps of:
    converting an image into a first image data array consisting of a first plurality of data elements, and which represents said image;
    forming a second image data array from the first image data array, said second image data array representing at least some of said image and consisting of a second plurality of data elements that has fewer data elements than said first plurality of data elements;
    recording the second image data array and at least a portion of the first image data array in predetermined areas of said recording medium, said portion of the first image data array recorded on said recording medium selected such that all of the first image data array is derivable and said second image data array together representing all of the first image data array; and
    recording respective area discriminating code data in said predetermined areas on said recording medium for identifying said predetermined areas in which said second image data array and said portion of the first image data array are recorded.

14. A method according to claim 13, wherein the step of forming the second image data array comprises forming at least some elements of the second image data array by selecting predetermined elements of the first image data array as said at least some elements of the second image data array.

15. The method of claim 14, wherein the step of forming the second image data array comprises forming at least some elements of the second image data array by selecting the predetermined elements of the first image data array as a plurality of elements of said first image data array representing a predetermined portion of said image.

16. The method of claim 15, further comprising the step of forming said portion of the first image data array by selecting predetermined elements of the first image data array representing a further portion of said image other than the predetermined portion thereof.

17. The method of claim 16, wherein the step of forming said portion of the first image data array comprises including therein predetermined elements of the first image data array representing an edge section of said predetermined portion of said image contiguous with said further portion of said image.

18. The method of claim 13, wherein the step of forming the second image data array comprises forming at least some elements of the second image data array by interpolating predetermined elements of the first image data array.

19. The method of claim 18, wherein the step of forming the second image data array comprises forming at least some elements of the second image data array by selecting predetermined of the first image data array as said at least some other elements of the second image data.

20. The method of claim 19, further comprising the step of forming said portion of the first image data array such that at least some elements of the first image data array not included in said portion of the first data array are represented by said at least some elements of the second image data array formed by interpolation of predetermined elements of the first image data array and elements included with the portion of the first image data array.

21. The method of claim 13, wherein the step of forming the second image data array comprises the steps of dividing the first image data array into a plurality of blocks of elements representing adjacent portions of said image, carrying out adaptive dynamic range coding of each of said plurality of blocks to form compressed data and dividing the compressed data into first and second groups of data as the second image array and the portion of the first image data array, respectively.

22. The method of claim 21, wherein the step of forming the second image data array further comprises the step of forming interpolated image data from the first image data array and dividing the first image data array and the interpolated image data into said plurality of blocks.

23. The method of claim 13, wherein the steps of forming the second image data array comprises storing the second image data array in predetermined second image data locations of a memory and reading the second image data array from the memory at predetermined times for recording in at least one of the predetermined areas of said recording medium.

24. The method of claim 13, wherein the step of recording area discriminating code data comprises appending respective area discriminating code data to the elements of the second image data array and to the elements of the portion of the first image data array prior to recording thereof on the recording medium.

* * * * *